US010179382B2

United States Patent
Miyazaki et al.

(10) Patent No.: US 10,179,382 B2
(45) Date of Patent: Jan. 15, 2019

(54) PALLET TRANSPORT SYSTEM OF MACHINE TOOL

(75) Inventors: Masaaki Miyazaki, Aiko-gun (JP); Tomoya Murakami, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 549 days.

(21) Appl. No.: 13/980,537

(22) PCT Filed: Feb. 15, 2011

(86) PCT No.: PCT/JP2011/053599
§ 371 (c)(1),
(2), (4) Date: Jul. 18, 2013

(87) PCT Pub. No.: WO2012/111166
PCT Pub. Date: Aug. 23, 2012

(65) Prior Publication Data
US 2013/0302128 A1 Nov. 14, 2013

(51) Int. Cl.
*B23Q 7/00* (2006.01)
*B23Q 7/14* (2006.01)
*B23Q 3/18* (2006.01)
(52) U.S. Cl.
CPC ............... *B23Q 7/00* (2013.01); *B23Q 3/186* (2013.01); *B23Q 7/1426* (2013.01); *Y10T 29/5196* (2015.01)
(58) Field of Classification Search
CPC ........ B23Q 1/267; B23Q 7/00; B23Q 7/1426; B23Q 7/14; B23Q 41/02; Y10T 29/5196; Y10T 29/5337; Y10T 29/53435
See application file for complete search history.

(56) References Cited

U.S. PATENT DOCUMENTS

| 4,797,989 A * | 1/1989 | Cherko | B23Q 3/15526 198/345.3 |
| 4,915,569 A * | 4/1990 | Cherko | B23Q 3/15526 198/346.1 |

(Continued)

FOREIGN PATENT DOCUMENTS

| EP | 1 731 260 | 12/2006 |
| JP | 62-102946 | 5/1987 |

(Continued)

OTHER PUBLICATIONS

Extended European Search Report dated Jun. 16, 2014, directed to EP Application No. 11858485.3; 6 pages.

(Continued)

*Primary Examiner* — Christopher M Koehler
(74) *Attorney, Agent, or Firm* — Morrison & Foerster LLP

(57) ABSTRACT

A pallet transport system of a machine tool promoting transport of a pallet for workpiece mounting use from a first stand to an adjoining second stand, wherein the first stand has a first mounting part which defines a first mounting surface, the second stand has a second mounting part which defines a second mounting surface, and the pallet has a mounted part attachable to the first and second mounting parts, along a transport direction of the pallet, includes a support mechanism turnably supporting at least one of the first stand, the second stand, and the pallet so that the orientations of a mounted surface defined by the mounted part and the second mounting surface match due to contact force between the mounted part and the second mounting part along with transport of the pallet from the first stand to the second stand along the first mounting surface.

1 Claim, 22 Drawing Sheets

(56) References Cited

U.S. PATENT DOCUMENTS

| | | | | |
|---|---|---|---|---|
| 5,018,617 A | * | 5/1991 | Miyata | B23Q 7/1431 |
| | | | | 198/346.1 |
| 2006/0130311 A1 | * | 6/2006 | Kikuchi | B23Q 7/02 |
| | | | | 29/563 |

FOREIGN PATENT DOCUMENTS

| JP | 9-262738 | 10/1997 |
|---|---|---|
| JP | 2005-161492 | 6/2005 |
| JP | 2009-262261 | 11/2009 |

OTHER PUBLICATIONS

International Search Report dated May 17, 2011, directed to International Application No. PCT/JP2011/053599; 4 pages.

* cited by examiner

Fig.10
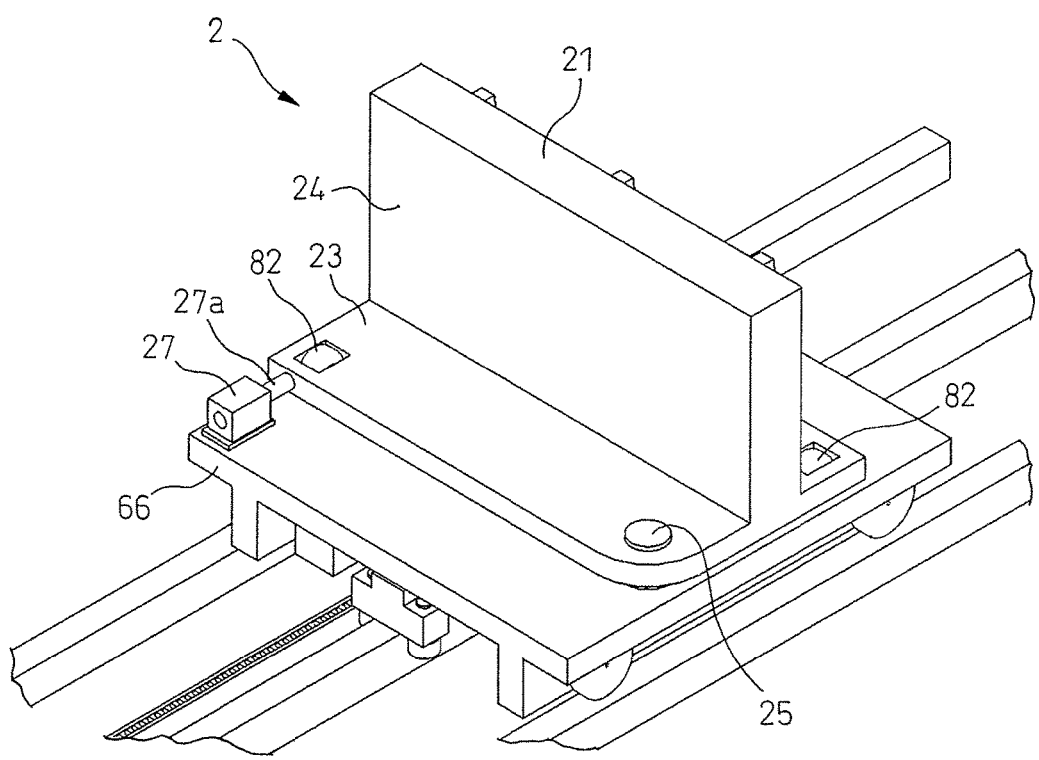
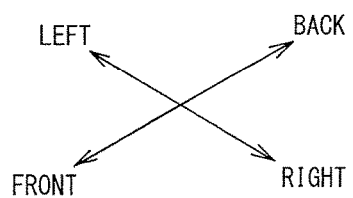

Fig.14
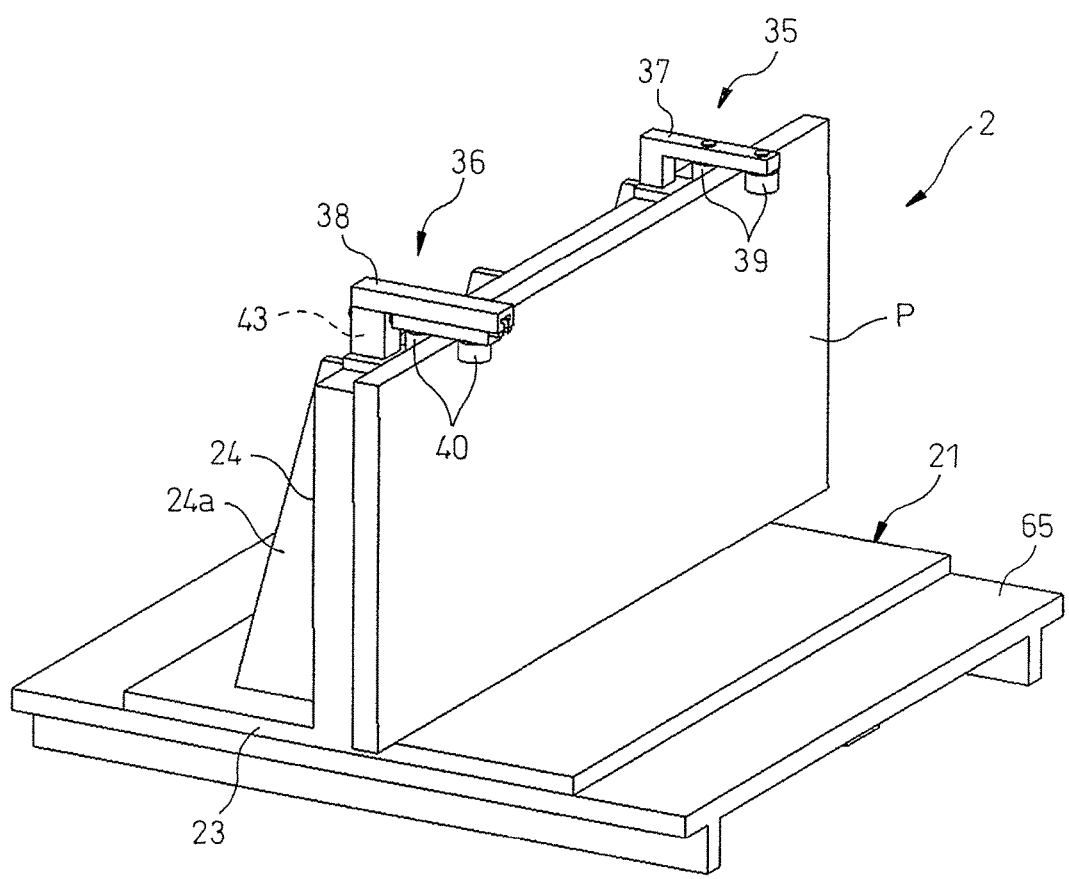
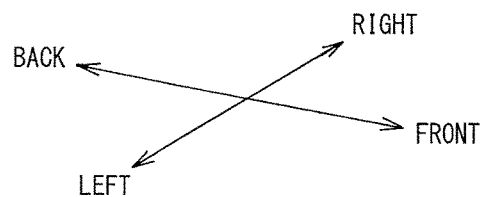

Fig.19
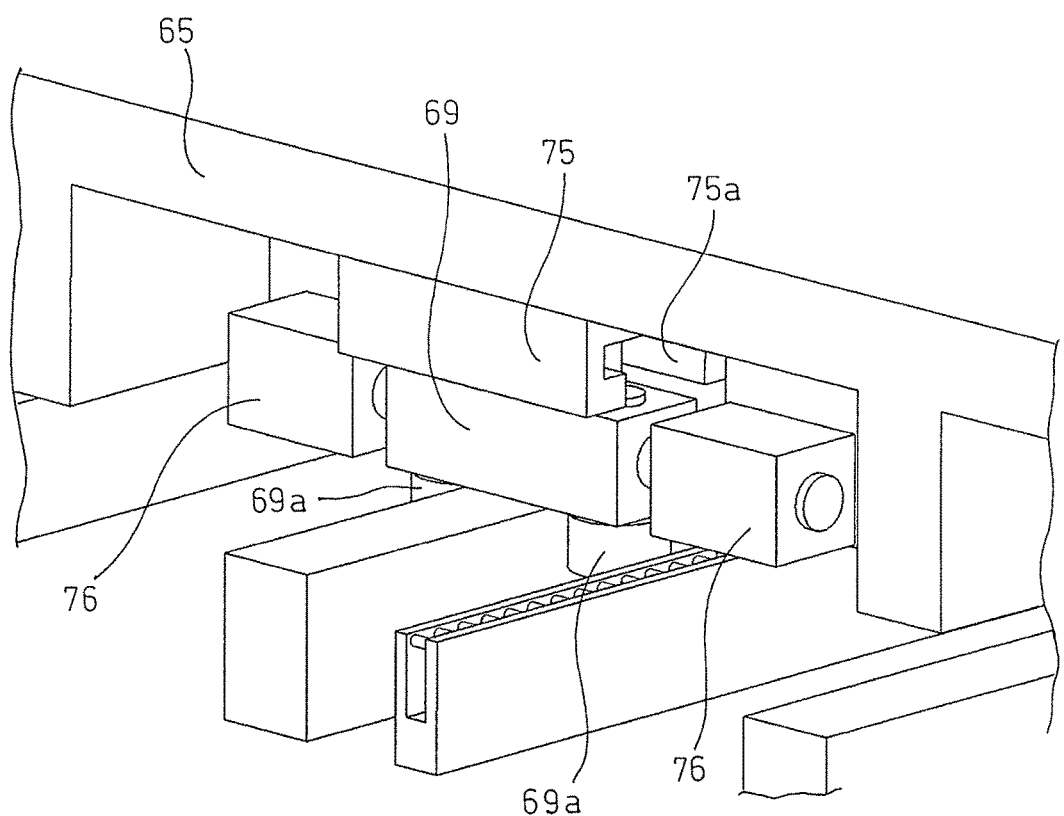
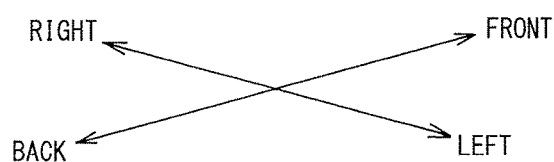

PALLET TRANSPORT SYSTEM OF MACHINE TOOL

REFERENCE TO RELATED APPLICATIONS

This application is the national stage application under 35 USC 371 of International Application No. PCT/JP2011/053599, filed Feb. 15, 2011, the entire contents of which are incorporated herein by reference.

FIELD OF THE INVENTION

The present invention relates to a pallet transport system of a machine tool which facilitates the transport of a pallet for mounting a workpiece from a first stand to an adjoining second stand.

BACKGROUND OF THE INVENTION

A system which sets a setup stand adjoining a machine tool and transports a pallet to which a workpiece is attached from the setup stand to a table of the machine tool is known (for example, see Patent Literature 1).

In the system described in this Patent Literature 1, both the setup stand and the table of the machine tool are respectively formed with pallet mounting surfaces in their vertical directions. The pallet mounting surfaces are respectively provided with pallet guide rails along the transport direction of the pallet. Further, the pallet mounting surface of the setup stand holds a pallet in a vertical posture and transports the held pallet to the table of the machine tool through the pallet guide rails by a drive operation of a motor. After that, the pallet is fastened to the pallet mounting surface of the table to machine the workpiece.

Japanese Unexamined Patent Publication No. 2009-262261A

SUMMARY OF THE INVENTION

When transporting the pallet from the setup stand to the table of the machine tool in this way, if the pallet mounting surface of the table is slanted with respect to the pallet mounting surface of the setup stand, smooth transport of the pallet is obstructed. For this reason, in order to enable smooth transport of the pallet, it is necessary to maintain the slant between the pallet mounting surfaces at a minimum (for example 0). However, the machine tool and the setup stand have assembly errors between the parts, etc. Therefore, it is not easy to form the pallet mounting surfaces so that the slant becomes 0.

The present invention provides a pallet transport system of a machine tool transporting a pallet for mounting a workpiece from a first stand to an adjoining second stand, the first stand having a first mounting part provided along a transport direction of the pallet, the first mounting part defining a first mounting surface, the second stand having a second mounting part provided along a transport direction of the pallet, the second mounting part defining a second mounting surface, the pallet having a mounted part provided along a transport direction of the pallet and attachable to the first mounting part and second mounting part, wherein the pallet transport system includes a support mechanism supporting turnably at least one of the first stand, the second stand, and the pallet so that an orientation of a mounted surface defined by the mounted part match an orientation of the second mounting surface, along with transport of the pallet along the first mounting surface from the first stand to the second stand.

BRIEF DESCRIPTION OF THE DRAWINGS

FIG. 10 is a perspective view of a pallet changing system at which a pallet transport system according to a first embodiment of the present invention is provided.

FIG. 14 is a perspective view of a pallet changing system at which a pallet transport system according to a second embodiment of the present invention is provided.

FIG. 19 is an enlarged view of principal parts of FIG. 18.

DETAILED DESCRIPTION OF THE INVENTION

Figure 1:
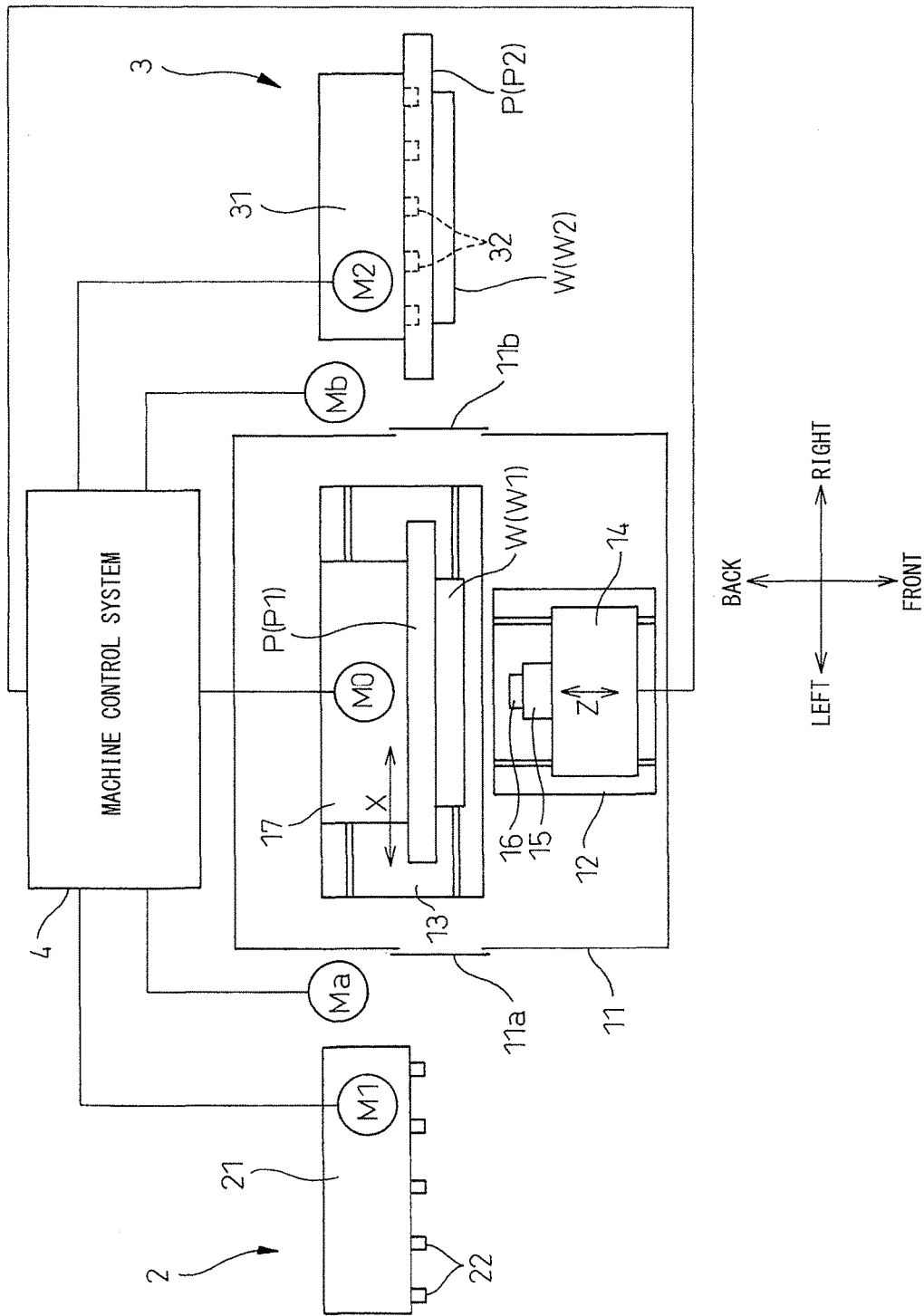
FIG. 1 is a plan view which shows a schematic configuration of a machine tool facility to which a pallet transport system according to a first embodiment of the present invention is applied.
Figure 2:
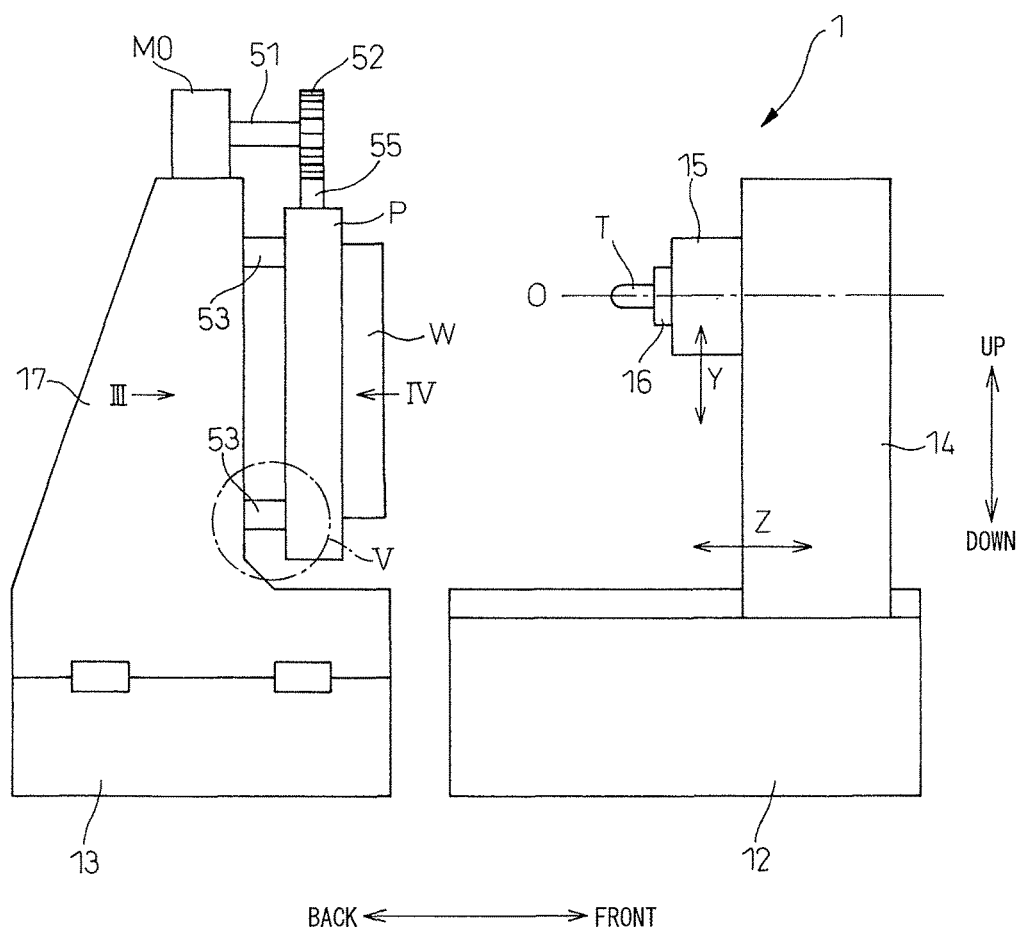
FIG. 2 is a side view of a machine tool of FIG. 1.

Hereinafter, referring to FIG. 1 to FIG. 13, a first embodiment of a pallet transport system of a machine tool according to the present invention will be explained. FIG. 1 is a plan view which shows the schematic configuration of a machine tool facility to which a pallet transport system according to the first embodiment of the present invention is applied, while FIG. 2 is a side view of a machine tool of FIG. 1. Below, for convenience, as illustrated, a front-back direction (Z-direction), left-right direction (X-direction), and up-down direction (Y-direction) are defined. The configurations of the parts will be explained in accordance with this definition. However, the configurations of the parts are not limited to the illustrated directions.

The machine tool facility of FIG. 1 is provided with a machine tool 1, pallet changing systems (also called "setup stations") 2 and 3 which are set adjoining the machine tool 1 at setup positions at the left and right sides of the machine tool 1, and a machine control system 4 which controls the machine tool 1 and the pallet changing systems 2 and 3. In this machine tool facility, pallets P are successively transported from one (left side) pallet changing system 2 to the machine tool 1 and from the machine tool 1 to the other (right side) pallet changing system 3. Pallet transport systems according to the present embodiment are provided at the pallet changing systems 2 and 3.

A workpiece W is attached to a pallet P in advance, then is transported together with the pallet P. The machine tool 1 is used to machine the workpiece W. FIG. 1 shows the state where a pallet P1 is transported from the pallet changing system 2 to the machine tool 1 and a pallet P2 is transported from the machine tool 1 to the pallet changing system 3. A workpiece W1 before being machined or in the middle of being machined is attached to the pallet P1, while a workpiece W2 after being machined is attached to the pallet P2.

The machine tool 1 is, for example, a horizontal type machining center. A pallet P is held standing longitudinally in the vertical direction. The machine tool 1 has a splash guard 11. The splash guard 11 surrounds a working region. The splash guard 11 is provided with opening parts for loading a pallet P in the working region and for unloading a pallet P from the working region, doors 11a and 11b for opening and closing the opening parts, and door opening and closing motors Ma and Mb for opening and closing the doors 11a and 11b.

As shown in FIGS. 1 and 2, the machine tool 1 has a first bed 12, a second bed 13 which is arranged at the back of the first bed 12 and separated from the first bed 12, a column 14 which is provided standing up on the first bed 12, a spindle head 15 which is supported on the column 14, a spindle 16 which is rotatably supported at the spindle head 15 about an axis of rotation O which extends in the front-back direction and to stick out backward from the back surface of the column 14, and a table 17 which is arranged on the second bed 13. At the front end portion of the spindle 16, a tool T is attached through a tool holder (not shown). The tool T is driven to rotate by a spindle motor inside the spindle head 15. At the front surface of the table 17, a pallet P is held in a vertical posture through pallet support parts (later explained guide rollers 53). At the front surface of the pallet P, a workpiece W is attached so as to face the tool T.

The column 14 is supported movably in the front-back direction on the top surface of the first bed 12 through a Z-axis linear feed mechanism. The spindle head 15 is movably supported in the up-down direction on the back surface of the column 14 through a Y-axis linear feed mechanism. The table 17 is movably supported in the left-right direction on the top surface of the second bed 13 through an X-axis feed mechanism. The X-axis, Y-axis, and Z-axis linear feed mechanisms are, for example, respectively comprised of ball screws, servo motors which drive to rotate the ball screws, guide rails which guide linear movement of the column 14, spindle head 15, and table 17, etc. Due to this configuration, the tool T and the workpiece W become able to move relatively in the perpendicular 3-axial directions (X-, Y-, and Z-axis directions). The workpiece W is machined by relative movement of the tool T and the workpiece W.

Figure 3:
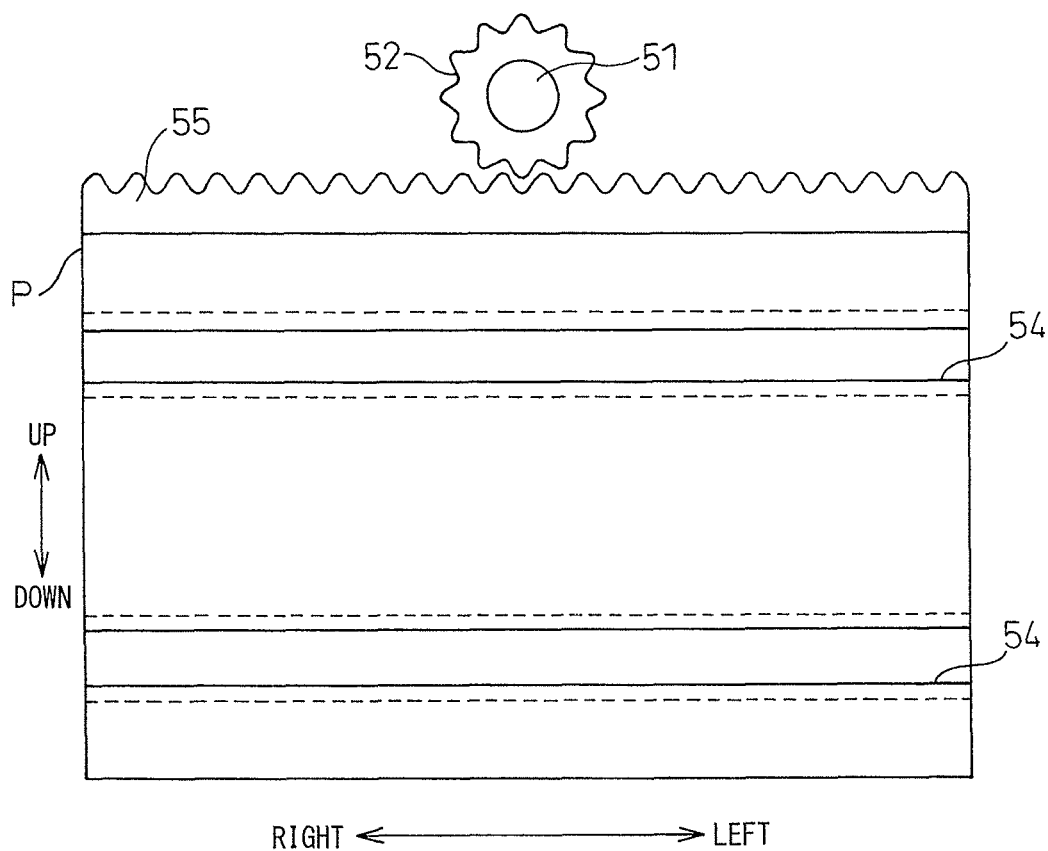
FIG. 3 is a view along a line III of FIG. 2.
Figure 4:
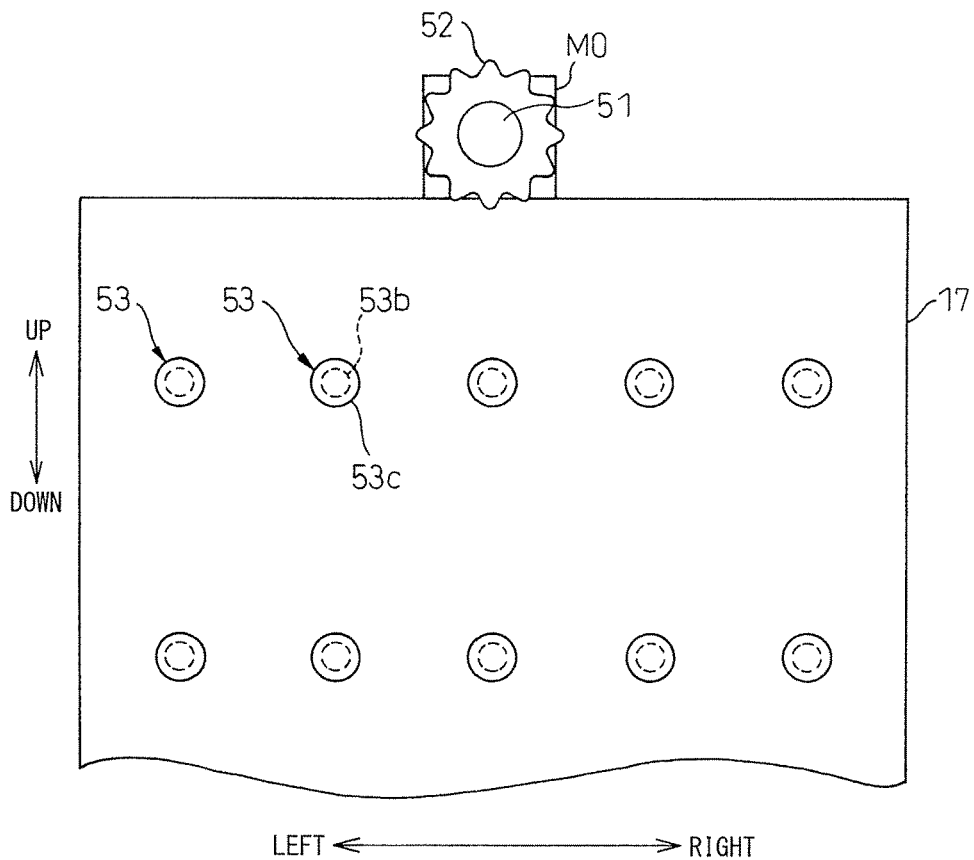
FIG. 4 is a view along a line IV of FIG. 2.
Figure 5:
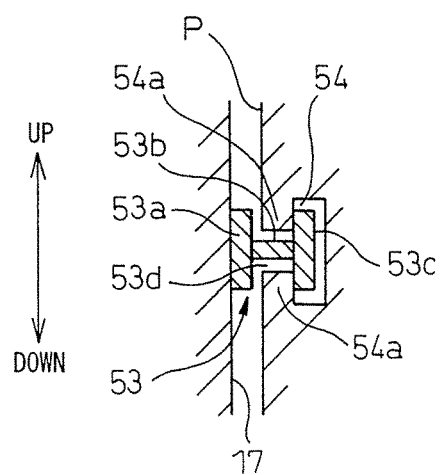
FIG. 5 is a cross-sectional view of a part V of FIG. 2.

FIG. 3 is a front view of a back surface of a pallet P (view along arrow III of FIG. 2), FIG. 4 is a front view of the table 17 which faces the pallet P (view along arrow of FIG. 2), and FIG. 5 is a cross-sectional view of a part V of FIG. 2.

As shown in FIG. 4, a drive motor M0 is set on a top surface of the table 17. An output shaft 51 of the drive motor M0 sticks out forward (see FIG. 2), and a pinion 52 is attached to the front end of output shaft. Further, at the front surface of the table 17, a plurality of pairs of top and bottom guide rollers 53 are attached separated at equal intervals in the left-right direction.

As shown in FIG. 3, at the top end portion of a pallet P, a rack 55 which engages with the pinion 52 is formed across the entire length in the left-right direction. Further, at the front surface of the pallet P, a pair of top and bottom groove parts 54 are formed across the entire length in the left-right direction corresponding to the guide rollers 53. As shown in FIG. 5, the groove parts 54 are enlarged at their depths (fronts) in the up-down direction compared with their entrance parts whereby projecting parts 54a are formed at the top and bottom sides of the entrance parts. at the back surface of the pallet P, it is also possible to attach a pair of top and bottom guide parts with cross-sections of substantially L-shapes facing each other so as to form a pair of top and bottom projecting parts. In this case, rather than provide the guide parts with cross-sections of substantially L-shapes across the entire length in the left-right direction, it is also possible to provide a plurality of guide parts at equal intervals in the left-right direction.

In FIG. 5, a guide roller 53 has a base part 53a which is attached to the front surface of the table 17, a shaft part 53b which extends to the front from the base part 53a, and a roller part 53c which is provided at the front end of the shaft part 53b. The roller part 53c is shaped as a substantially circular plate about the shaft part 53b. For this reason, the roller part 53c sticks out in the top-bottom and left-right directions from the shaft part 53b to form between the base part 53a and the roller part 53c a holding space 53d which holds the projecting parts 54a of the pallet P. While not shown, rollers are attached to the top and bottom surfaces and the front surface of the roller part 53c to facilitate movement of the pallet P in the left-right direction along the guide roller 53.

Part of the plurality of guide rollers 53 are configured by pistons which move the roller parts 53c in the front-back direction. Due to the retracting operations of the pistons, the roller parts 53c move to the back, the back surface of the pallet P abuts against the front end surface of the base parts 53a, and the pallet P can thereby be clamped and fastened to the table 17. Instead of the guide rollers 53, the clamp parts may also be configured by members separated from the guide rollers 53.

In such a machine tool 1, the groove parts 54 of the pallet P engage with the guide rollers 53 movably in the left-right direction. For this reason, if rotating the pinion 52 rotate by the drive motor M0 with the clamping by the clamp parts released, the rack 55 which engages with the pinion 52 moves. Due to this, the pallet P moves in the left-right direction along the table 17 while being guided by the guide rollers 53.

In FIG. 1, the pallet changing systems 2 and 3 have pallet support stands 21 and 31 which are provided standing in the vertical direction. At the top surfaces of the pallet support stands 21 and 31, drive motors M1 and M2 are set. The output shafts of the drive motors M1 and M2, like the drive motor M0, have pinions 52 attached to them.

At the front surfaces of the pallet support stands 21 and 31, guide rollers 22 and 32 are provided. The guide rollers 22 and 32 are configured in the same way as the guide rollers 53 of the table 17. That is, the guide rollers 22 and 32 are respectively provided in pluralities of top and bottom pairs separated in the left-right direction. The guide rollers 22 and 32 engage with the groove parts 54 of a pallet P, whereby pallets P are supported by the front surfaces of the pallet support stands 21 and 31. If, in the state with pallets P supported at the front surfaces of the pallet support stands 21 and 31, rotating the pinions 52 by the drive motors M1 and M2, the pallets P move along the pallet support stands 21 and 31 in the left-right direction while being guided by the guide rollers 22 and 32.

The door opening and closing motors Ma and Mb and the drive motors M0, M1, and M2 of FIG. 1 are controlled by the machine control system 4. The machine control system 4 also controls the startup and stopping of the machine tool 1 and the operation of a tool changing system which is provided at the machine tool 1. Furthermore, the machine control system 4 has the function of reading and interpreting an NC program and issuing movement commands.

Figure 6:
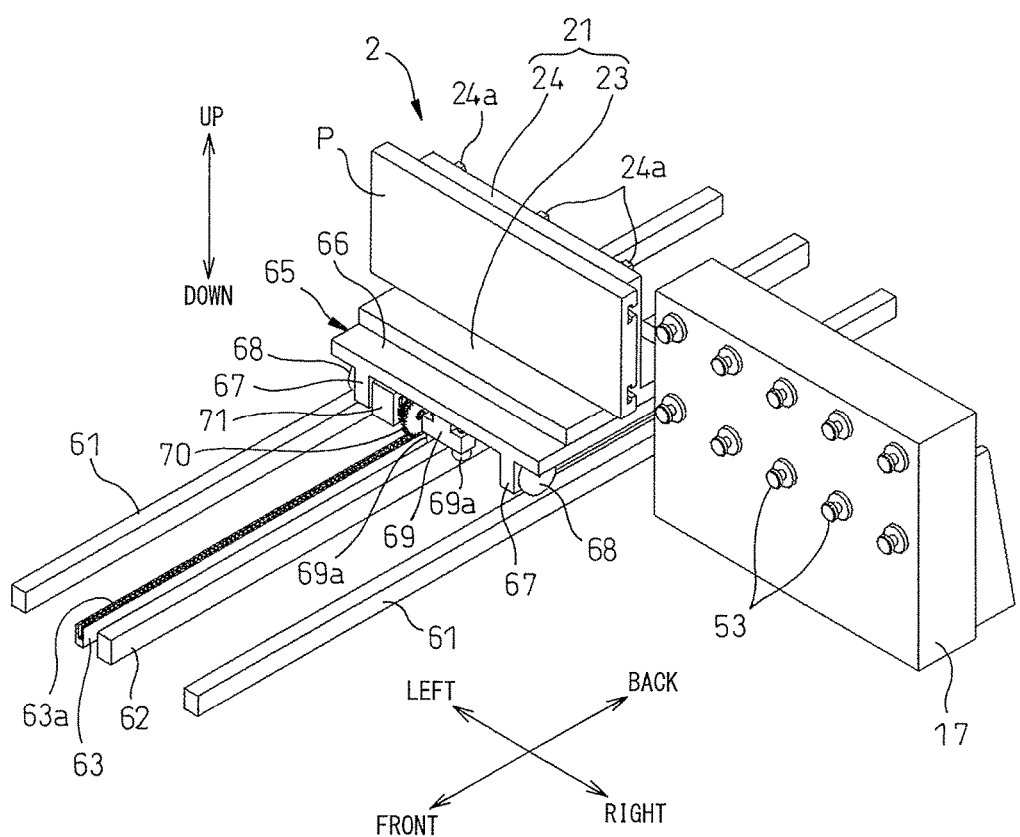
FIG. 6 is a perspective view which shows an example of a pallet changing system.

The pallet changing systems 2 and 3 in the present embodiment are movably provided along rails. FIG. 6 is a perspective view which shows the schematic configuration of the left side pallet changing system 2. Since the left and right pallet changing systems 2 and 3 are the same in basic configurations, below only the configuration of the left side pallet changing system 2 will be explained and the explanation of the right side pallet changing system 3 will be omitted. Further, in FIG. 6, for convenience, illustration of the drive motors M0 and M1 and workpiece W will be omitted and only the table 17 will be shown as the configuration of the machine tool 1.

As shown in FIG. 6, at the side of the machine tool 1 (table 17), a pair of left and right rails 61 and a center rail 62 inside of the rails 61 are laid substantially in parallel with each other in the front-back direction. At the left of the center rail 62, a gear rail 63 which has gear parts 63a at the top surface is laid substantially in parallel with the center rail 62 in the front-back direction. A carriage 65 is placed on the top surface of the rail 62.

The carriage 65 has a flat plate part 66 which extends in the horizontal direction, a pair of left and right long plate parts 67 which project downward from the bottom surface of the flat plate part 66 and extend in the front-back direction, tires 68 which are attached at the outsides at the left and right of the long plate parts 67 and at the front and back ends (only the front side shown) rotatably about the left-right direction axis, guide blocks 69 which are provided at the left-right center of the bottom surface of the flat plate part 66 and at the front and back ends (only the front side shown), a drive motor 71 which is attached at the bottom surface of the plate part 66 at the left of the front side guide block 69, and a drive gear 70 which is driven to rotate by the drive motor 71. The tires 68 are attached to be able to roll over the top surface of the left and right rails 61.

The pallet support stand 21 is placed on the top surface of the flat plate part 66. The pallet support stand 21 has a base part 23 of a substantially rectangular shape in a plan view and a stand part 24 which is provided standing upward from the center of the base part 23 in the front-back direction. The stand part 24 is provided across the entire length in the left-right direction of the base part 23. The guide rollers 22 (FIG. 1) are provided at the front surface of the stand part 24, whereby the pallet P is supported at the stand part 24 separated from the base part 23. The back surface of the stand part 24 is provided with ribs 24a.

Each guide block 69 has a pair of left and right rollers 69a. The center rail 62 is laid inside the left and right rollers 69a. Due to this, the position of the carriage 65 in the left-right direction is restricted and the tires 68 can roll over the rails 61 without detaching from the top surface of the rails. The drive gear 70 engages with the gear parts 63a of the gear rail 63. If the drive gear 70 is rotated by the drive motor, the carriage 65 moves along the rails 61 in the front-back direction. The drive motor 71 is controlled by the machine control system 4.

While not illustrated, the rails 61, the center rail 62, and the gear rail 63 extend from the setup position at the side of the table 1 to, for example, a pallet stocker in which pallets P are stocked. Therefore, the carriage 65 moves between the pallet stocker and the setup position whereby a pallet P arranged at the pallet stocker is conveyed to the setup position.

Figure 7:
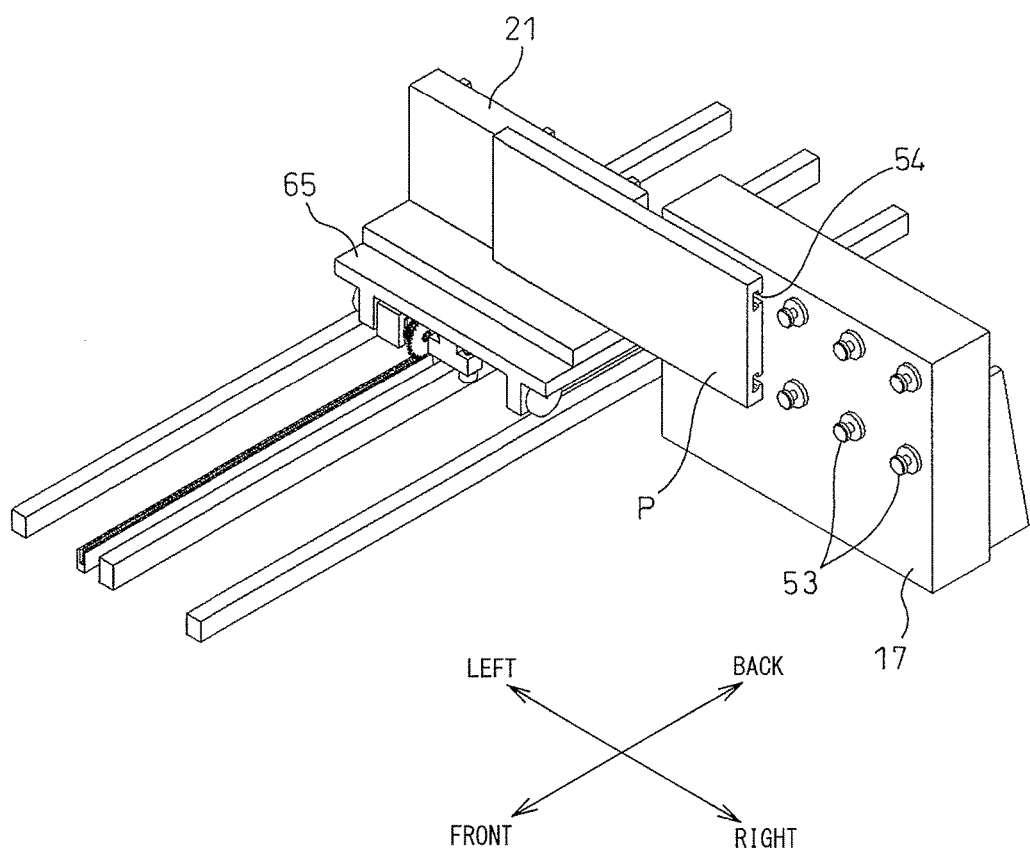
FIG. 7 is a perspective view which shows a state of transport of a pallet according to the pallet changing system of FIG. 6.
Figure 8:
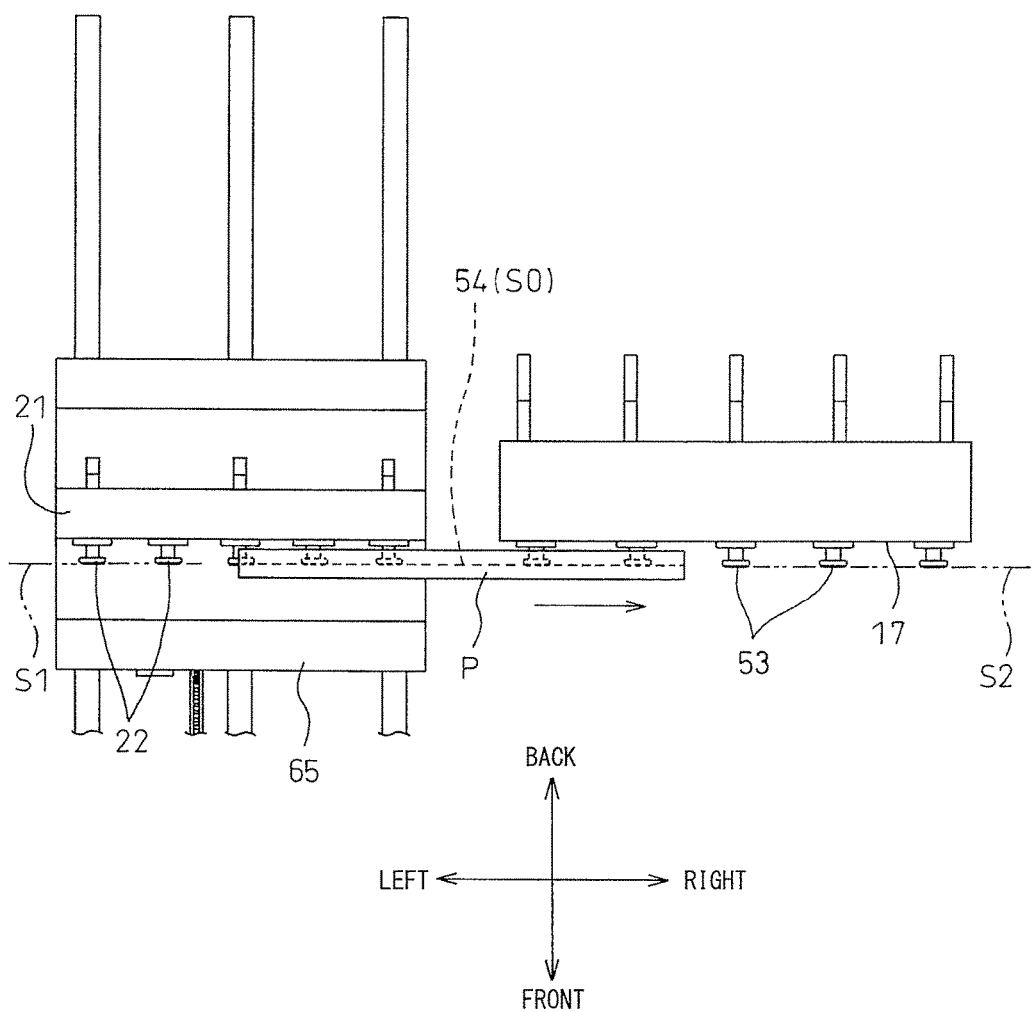
FIG. 8 is a plan view which shows a state of transport of a pallet according to the pallet changing system of FIG. 6.

At the time of conveyance of a pallet P, the drive motor M1 which is provided at the pallet support stand 21 (FIG. 1) is made to stop. In this state, the pinion 52 at the front end part of the drive motor M1 and the rack 55 at the top end portion of the pallet engage, whereby movement of the pallet P in the left-right direction is blocked. A pallet P conveyed to the setup position is transported to the table 17 by the drive motor M1. FIG. 7 is a perspective view which shows this state of transport, while FIG. 8 is a plan view. In FIG. 7, illustration of the guide rollers 22 at the front surface of the pallet support stand 21 is omitted.

In FIGS. 7 and 8, the groove parts 54 at the back surface of the pallet P engage with both the guide rollers 22 of the front surface of the pallet support stand 21 and the guide rollers 53 of the front surface of the table 17. Below, as shown in FIG. 8, the mounting surfaces of the pallet P which are determined by the guide rollers 22 and 53 are defined as the first engagement surface S1 and second engagement surface S2, while the mounted surface of the pallet P which is determined by the groove parts 54 is defined as the engaged surface S0.

The first engagement surface S1 and the second engagement surface S2 are, for example, vertical surfaces which extend along the front surfaces of the guide rollers 22 and 53 in the left-right direction, while the engaged surface S0 is a vertical surface which extends along the bottom surfaces of the groove parts 54 in the left-right direction. The first engagement surface S1 and second engagement surface S2 are respectively parallel to the front surfaces of the pallet support stand 21 and the table 17. The engagement surfaces S1 and S2 are used to express the orientations of the pallet support stand 21 and the table 17. The engaged surface S0 is parallel to the back surface of the pallet P. The engaged surface S0 is used to express the orientation of the pallet P.

In FIGS. 7 and 8, the first engagement surface S1 and the second engagement surface S2 are on the same plane as each other. The orientations of these engagement surfaces S1 and S2 match the orientation of the engaged surface S0. That is, the first engagement surface S1 and the second engagement surface S2 face the engaged surface S0 in a parallel state without slant. In FIG. 8, the engagement surfaces S1 and S2 and the engaged surface S0 are shown on the same plane. In this Description, this case as well is defined as a "parallel state".

If the first engagement surface S1 and second engagement surface S2 are on the same plane as each other in this way, the groove parts 54 of a pallet P which is transported from the pallet support stand 21 to the right smoothly engage with the guide rollers 53 of the table 17. For this reason, it is possible to easily transport the pallet P from the pallet support stand 21 to the table 17 by the drive motor M1.

Figure 9:
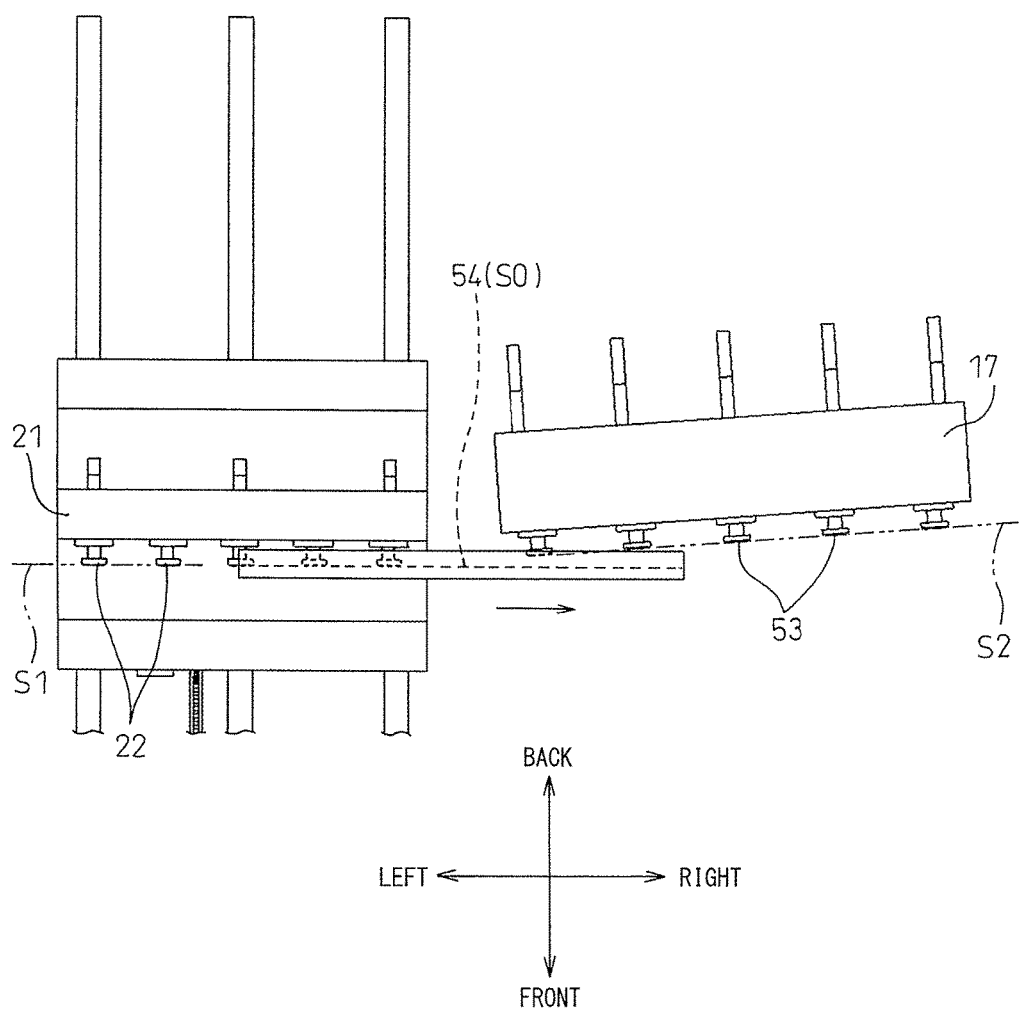
FIG. 9 is a view which explains problems at the time of transport of a pallet.

In this regard, the table 17 is provided at the machine tool 1, while the pallet support stand 21 is provided at the pallet changing system 2. For this reason, due to assembly error of the parts, looseness, etc., it is difficult to precisely form the first engagement surface S1 and the second engagement surface S2 on the same plane as each other. For example, as shown in FIG. 9, the second engagement surface S2 is slanted with respect to the first engagement surface S1. If transporting a pallet P toward the table 17 in this state, the end portions of guide rollers 53 (roller parts 53c of FIG. 5) contact the edge parts of the groove parts 54 (for example, back surfaces of projecting parts 54a of FIG. 5) whereby an excessive load acts on the guide rollers 53. As a result, the guide rollers 53 deform and transport of a pallet P along the guide rollers 53 becomes difficult.

To prevent this, for example, a crane, etc. has to be used to change the orientation of the pallet support stand 21 so that the orientation of the first engagement surface S1 matches the orientation of the second engagement surface S2, in other words, so that the slant of the second engagement surface S2 with respect to the first engagement surface S1 becomes 0. However, in this case, not only is tremendous work required, but also a lot of time is consumed for conveyance of a pallet P. In particular, if a pallet P is long in the left-right direction, even if the slants of the engagement surfaces S1 and S2 are small, transport of the pallet P becomes difficult. Therefore, the engagement surfaces S1 and S2 have to be precisely made to match and much more time is consumed for conveyance of a pallet P.

Therefore, in the present embodiment, in the following way, the pallet changing systems 2 and 3 are provided with pallet transport systems to support turnably the pallet support stands 21 on the carriage 65. Due to this, the orientations of the engagement surfaces S1 and S2 are made the same as each other and transport of a pallet P is facilitated.

Figure 11:
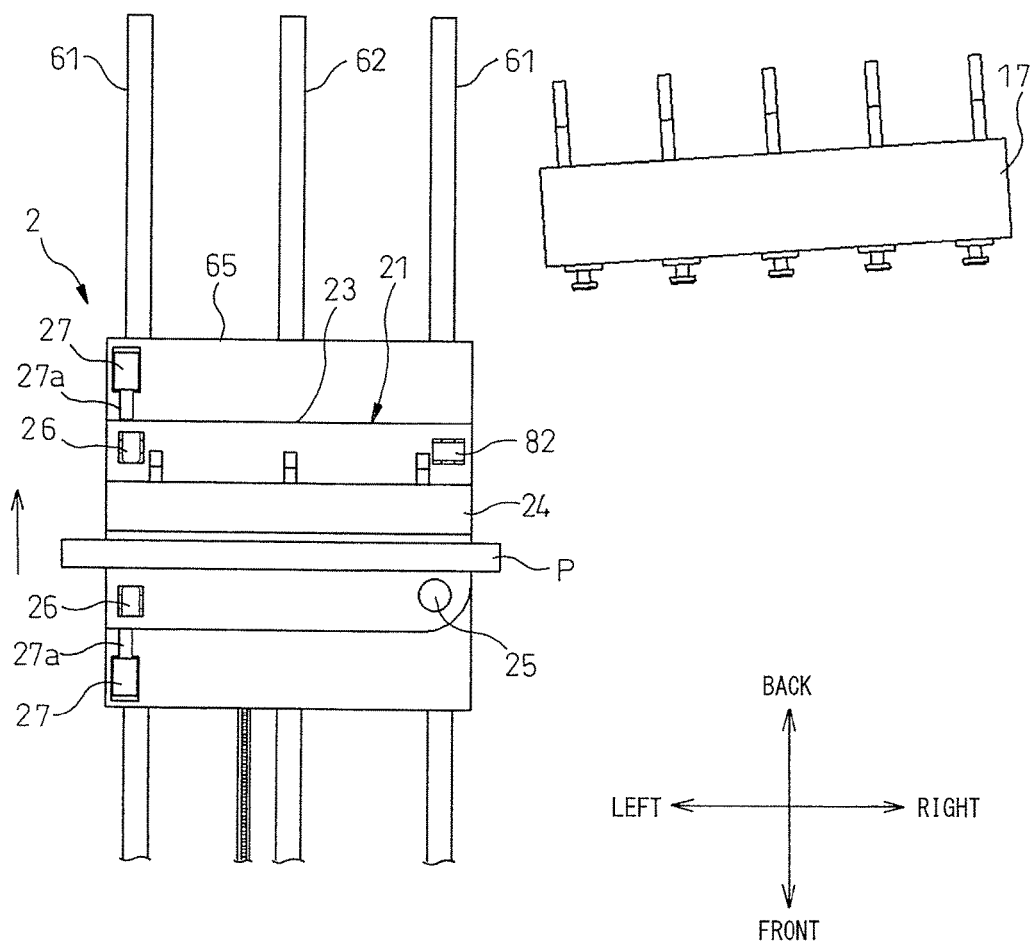
FIG. 11 is a plan view of the pallet changing system of FIG. 10.

FIG. 10 is a perspective view of the pallet changing system 2 which has the pallet transport system according to first embodiment, while FIG. 11 is a plan view. In FIG. 10, illustration of a pallet P, guide rollers 22, and the drive motor M1 is omitted, while in FIG. 11, illustration of the guide rollers 22 and the drive motor M1 is omitted. FIG. 11 shows the state of movement where the pallet changing system 2 moves toward the setup position.

As shown in FIGS. 10 and 11, a shaft part 25 is provided in a vertical direction at the right front end portion of the base part 23 of the pallet support stand 21, and the pallet support stand 21 is turnably supported at the top surface of the carriage 65 through the shaft part 25. The left front end portion, the left back end portion, and the right back end portion of the bottom surface of the base part 23 have tires 26 attached to them. The tires 26 can roll over the top surface of the carriage 65.

At the left end part of the top surface of the flat plate part 66 of the carriage 65, fastening cylinders 27 are attached to the front and back sides of the base part 23. The fastening cylinders 27 have pistons 27a extendable and retractable in the front-back direction toward the base part 23. If the pistons 27a are extended and thereby the front end portions of the pistons 27a abut against the front and back ends of the base part 23, turning of the pallet support stand 21 is blocked. On the other hand, if the pistons 27a are retracted and thereby the front end portions of the pistons 27a are separated from the front and back ends of the base part 23, turning of the pallet support stand 21 is permitted. The extension and retraction operations of the pistons 27a are controlled by the machine control system 4.

The main operations of a pallet transport system of a machine tool according to the first embodiment will be explained next. As shown in FIG. 11, when moving the carriage 65 along the rails 61, the pistons 27a of the fastening cylinders 27 are extended. Due to this, turning of the pallet support stand 21 is blocked, the pallet support stand 21 can be fastened on the carriage 65, and looseness of a pallet P can be suppressed.

Figure 12:
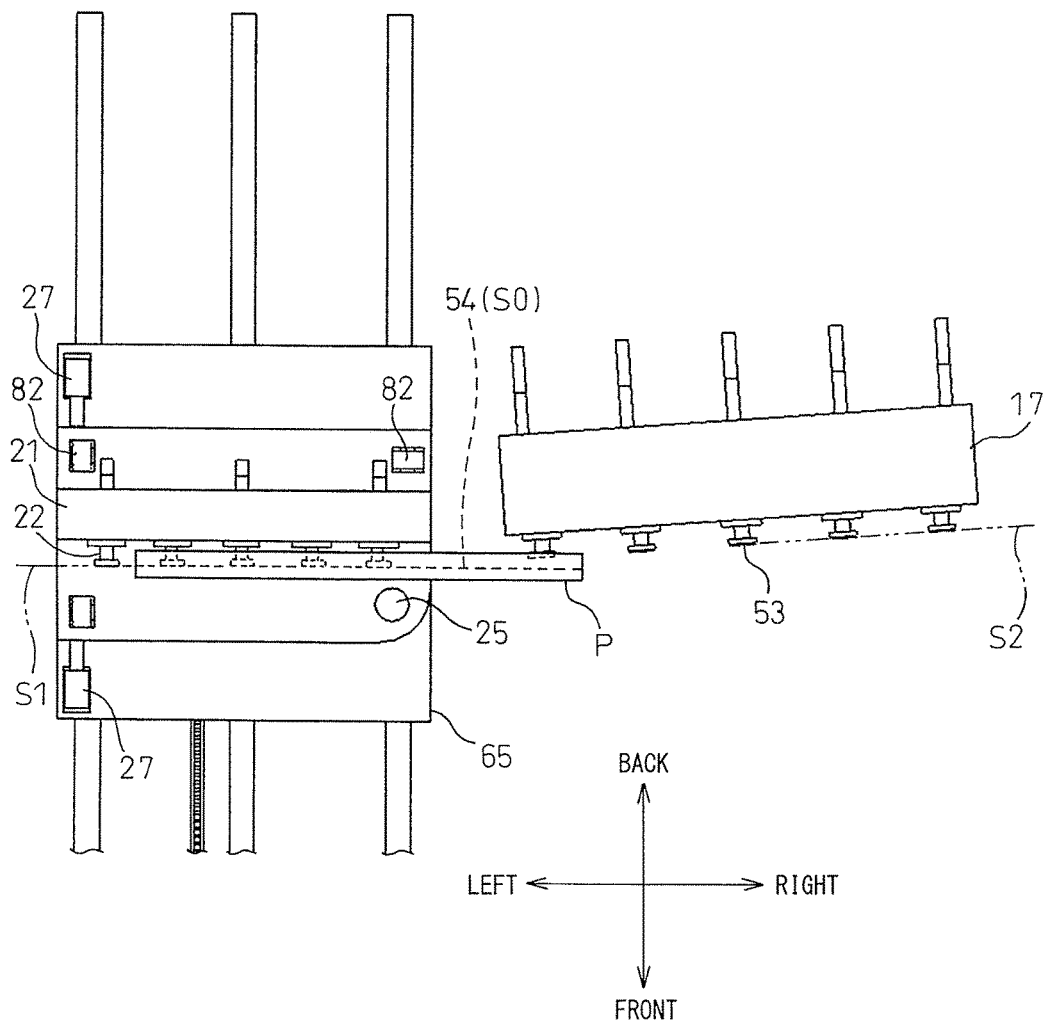
FIG. 12 is a plan view which shows one example of an operation by the pallet transport system according to the first embodiment.

As shown in FIG. 12, when the carriage 65 reaches the setup position at the side of the machine tool 1, the drive motor M1 of the pallet support stand 21 is driven. Due to this, the pallet P starts to move toward the table 17 while being guided by the guide rollers 22. At the time of movement of the pallet P, the pistons 27a of the fastening cylinders 27 are retracted and the pallet support stand 21 is rendered a state turnable about the shaft part 25.

Figure 13:
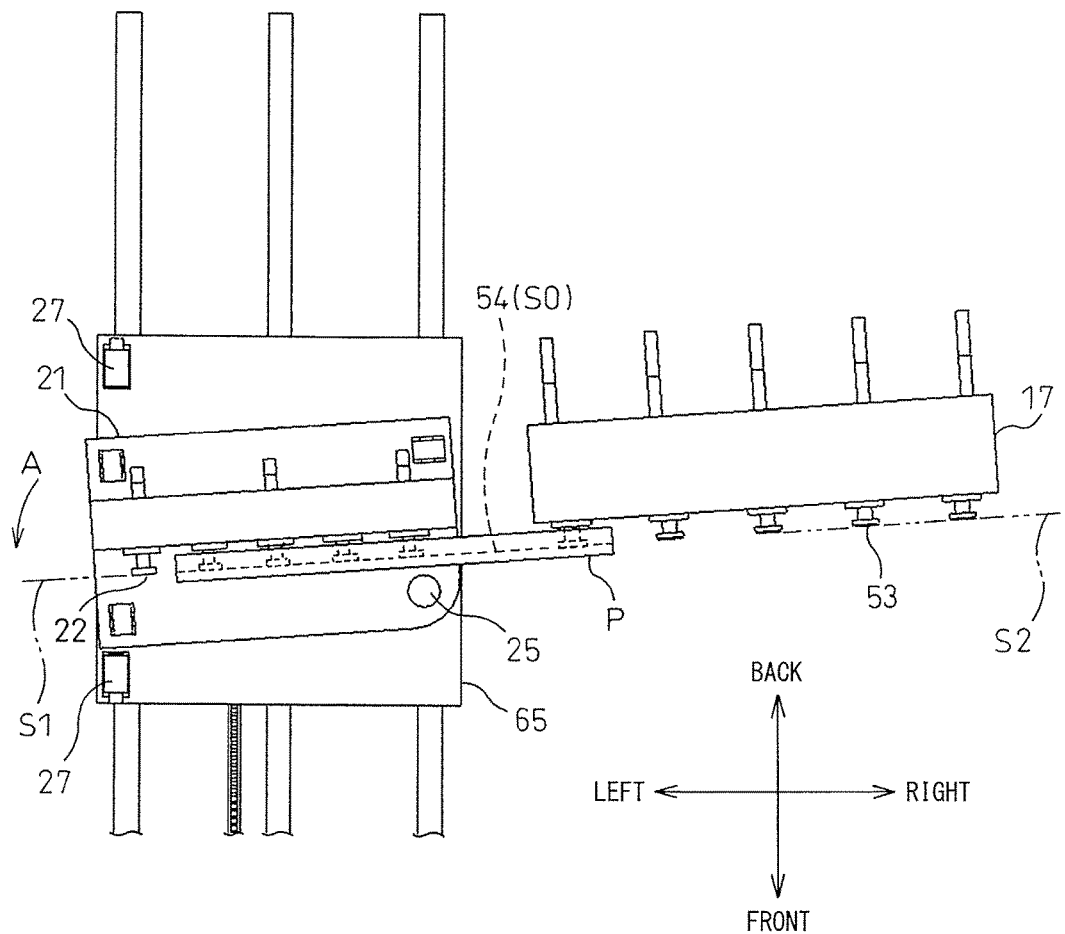
FIG. 13 is a plan view which shows an operation following the operation in FIG. 12.

At this time, if the second engagement surface S2 of the table 17 is slanted with respect to the first engagement surface S1 of the pallet support stand 21, the second engagement surface S2 of the table 17 and the engaged surface S0 of the pallet P are not in a parallel state. For this reason, in the initial state after the start of movement of the pallet P, the end portions of the guide rollers 53 contact the groove parts 54 of the pallet P whereby a counter force (contact force) acts between the guide rollers 53 and the groove parts 54. Due to this contact force, a pushing force to the front or the back acts on the pallet P so that the engaged surface S0 and the second engagement surface S2 become a parallel state. Therefore, as shown in FIG. 13, the pallet support stand 21 turns about the shaft part 25 on the carriage in the arrow "A" direction, and the first engagement surface S1 moves on the extended plane of the second engagement surface S2. As a result, the engaged surface S0 and the second engagement surface S2 become parallel states, the contact force between the guide rollers 53 and the groove parts 54 decreases, and the pallet P can be smoothly transported to the table 17.

On the other hand, while the illustration is omitted, when a pallet P is transported from the table 17 to the pallet changing system 3 after the workpiece W finishes being machined, the drive motor M0 of the table 17 is driven. Due to this, the pallet P starts to move toward the pallet changing system 3. In this case, in the pallet changing system 3, like the pallet changing system 2, the pallet support stand 31 is turnably supported on the carriage 65 about the shaft part 25. For this reason, when the engagement surface (called the third engagement surface) of the guide rollers 32 (FIG. 1) is slanted with respect to the second engagement surface S2 of the guide rollers 53, the contact force between the groove parts 54 and the guide rollers 32 causes the pallet support stand 31 to turn on the carriage 65 whereby the slant of the third engagement surface of the guide rollers 32 is corrected. Therefore, the pallet P can be smoothly transported to the workpiece changing system 3.

According to the present embodiment, the following function effects can be exhibited.

(1) The pallet support stand 21 of the pallet changing system 2 is turnably supported about the shaft part 25 on the carriage 65 in a horizontal plane. Due to this, when the second engagement surface S2 is slanted with respect to the first engagement surface S1, the contact force between the guide rollers 53 and the groove parts 54 enables that slant to be corrected. As a result, deformation of the guide rollers 53 is suppressed and the pallet P can be smoothly transported from the pallet changing system 2 to the table 17.

(2) The contact force between the guide rollers 53 and the groove parts 54 enables the slant of the second engagement surface S2 with respect to the first engagement surface S1 to be automatically corrected. Therefore, an actuator, etc. for turning the pallet support stand 21 is unnecessary and the pallet transport system can be inexpensively configured.

(3) The pallet support stand 21 is placed on the carriage 65 through tires 82. Therefore, the turning resistance of the pallet support stand 21 is small and the orientation of the pallet support stand 21 can be easily changed.

(4) Fixed cylinders 27 are provided at the front and back sides of the pallet support stand 21. Therefore, the pallet support stand 21 can be fastened to the carriage 65 and looseness of the pallet P can be suppressed at the time that the carriage 65 is run.

Figure 15:
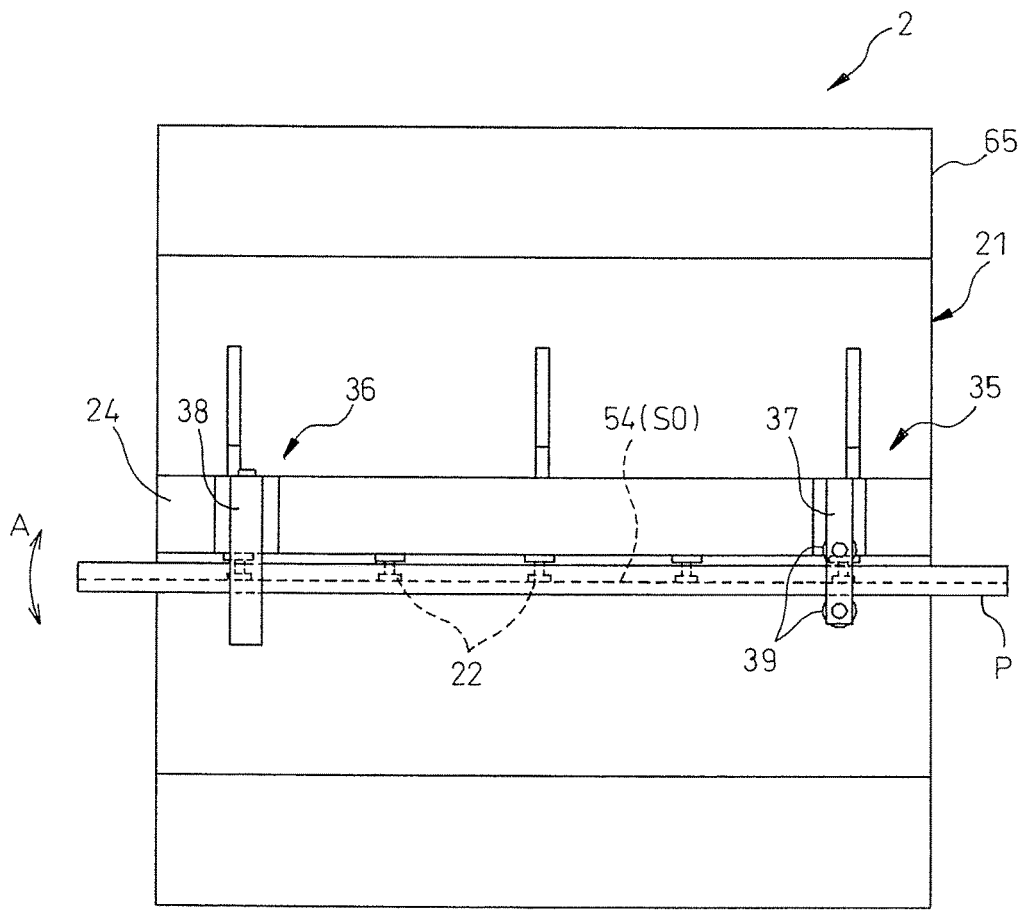
FIG. 15 is a plan view of the pallet changing system of FIG. 14.
Figure 16:
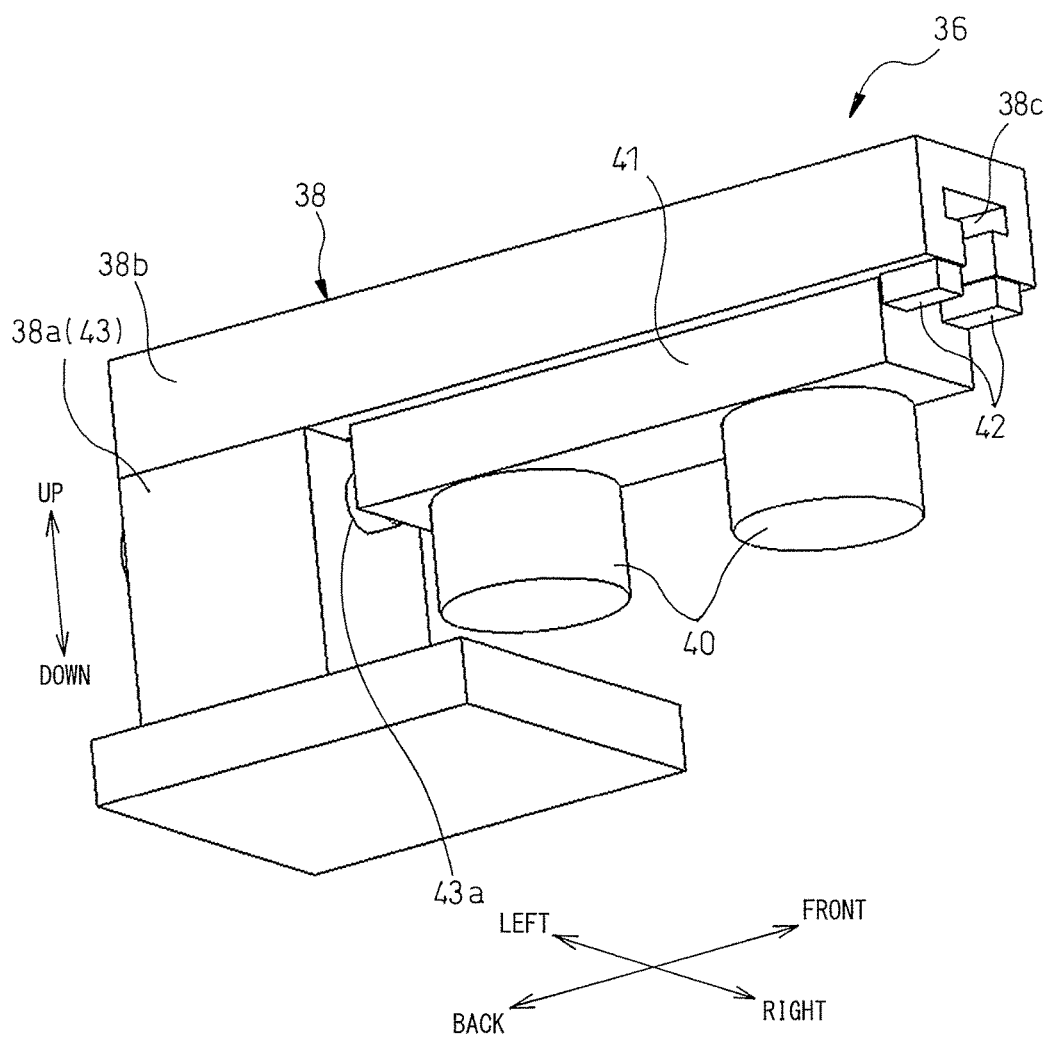
FIG. 16 is an enlarged view of principal parts of FIG. 14.

Referring to FIG. 14 to FIG. 16, a second embodiment of the present invention will be explained. In the first embodiment, the pallet support stand 21 is turnably provided on the carriage 65 so as to change the orientation of the engaged surface S0. In contrast to this, in the second embodiment, a pallet P is turnably provided on the pallet support stand 21 so as to change the orientation of the engaged surface S0.

FIG. 14 is a perspective view of a pallet changing system 2 which has a pallet transport system according to the second embodiment, while FIG. 15 is a plan view. Portions the same as in FIG. 1 to FIG. 13 are assigned the same reference notations. Below, the points of difference from the first embodiment will mainly be explained.

As shown in FIGS. 14 and 15, the pallet support stand 21, unlike the first embodiment, is fastened to the top surface of the carriage 65. At the front surface of the pallet support stand 21, a pallet P is slidably supported in the left-right direction through guide rollers 22. A drive motor M1 (FIG. 1) is provided on the top surface of the pallet support stand 21, a pinion 52 (FIG. 2) is attached to the front end portion of the motor output shaft, and furthermore, a rack 55 (FIG. 2) which engages with the pinion 52 is formed on the top surface of the pallet P. However, illustration of these points is omitted.

In the second embodiment, a pair of left and right support rollers 35 and 36 are attached to the top surface of the pallet support stand 21. The left and right support rollers 35 and 36 have substantially L-shaped arms 37 and 38 which pass above the pallet P and extend to the front and have pairs of front and back rollers 39 and 40 which are rotatably provided about vertical direction rotary shafts. The rollers 39 of the support roller 35 are rotatably supported at the bottom surface of the arm 37 and are arranged at the front and back straddling the pallet P.

On the other hand, the rollers 40 of the support roller 36, as explained below, are movably provided in the front-back direction with respect to the arm 38. FIG. 16 is a perspective view of the support roller 36. The arm 38 has a base part 38a and a plate part 38b which sticks out to the front from the top surface of the base part 38a. At the bottom surface of the plate part 38b, a guide groove 38c is provided in the front-back direction. A slider 41 is slidably engaged with the guide groove 38c. At the front end portion of the bottom surface of the plate part 38b, a stopper 42 which limits movement of the slider 41 is provided. At the slider 41, a pair of rollers 40 are rotatably supported separated to the front and back. As shown in FIG. 14, the pallet P is inserted between the rollers 40. The base part 38a of the arm 38 houses a fastening cylinder 43. A piston 43a extendable and retractable in the front-back direction sticks out from the front surface of the base part 38a.

The extension and retraction operation of the piston 43a is controlled by the machine control system 4. Under this control, the piston 43a is extended forward other than when transporting the pallet P from the pallet changing system 2 to the table 17. Due to this, the slider 41 is pushed forward, the front end surface of the slider 41 abuts against the stopper 42, and the slider 41 is fastened to the arm 38. As a result, turning of the pallet P with respect to the pallet support stand 21 is prohibited and shaking of the pallet P can be suppressed.

At the time of transport of a pallet P, the piston 43a is retracted backward. Due to this, the slider 41 is rendered a state slidable in the front-back direction. In this state, the drive motor M1 is driven to start transport of the pallet P. At this time, when the engagement surface S1 of the pallet support stand 21 and the engagement surface S2 of the table 17 are not on the same plane, the contact force between the guide rollers 53 of the table 17 and the groove parts 54 of the pallet P causes a pushing force to act on the pallet P to the front or the back. Due to this, the rollers 40 of the support roller 36 move in the front-back direction with respect to the surface part 24 of the pallet support stand 21. As shown in FIG. 15, the pallet P turns in the arrow "A" direction about the support roller 35. As a result, the orientation of the engaged surface S0 is changed, and it is possible to smoothly transport the pallet P to the table 17.

In the second embodiment, the pallet P is turnably provided with respect to the pallet support stand 21 by the support rollers 35 and 36. However, if configuring the guide rollers 22 and the groove parts 54 in the same way as the first embodiment, the turning range of a pallet P is limited by the engagement of the two. Therefore, in order to increase the turning range of a pallet P, for example, it is also possible to configure the pallet support parts of the front surface of the pallet support stand 21 so that the guide rollers 22 move in the front-back direction together with the pallet P. Alternatively, it is also possible to disengage the guide rollers 22 and the groove parts 54, and configure the pallet support parts so as to position the pallet P in only the up-down direction.

Referring to FIG. 17 to FIG. 21, a third embodiment of the present invention will be explained. In the third embodiment, the pallet support stand 21 is fastened to the top surface of the carriage 65 and the carriage 65 is turnably provided with respect to the rails 61 so as to change the orientation of the engaged surface S0.

Figure 17:
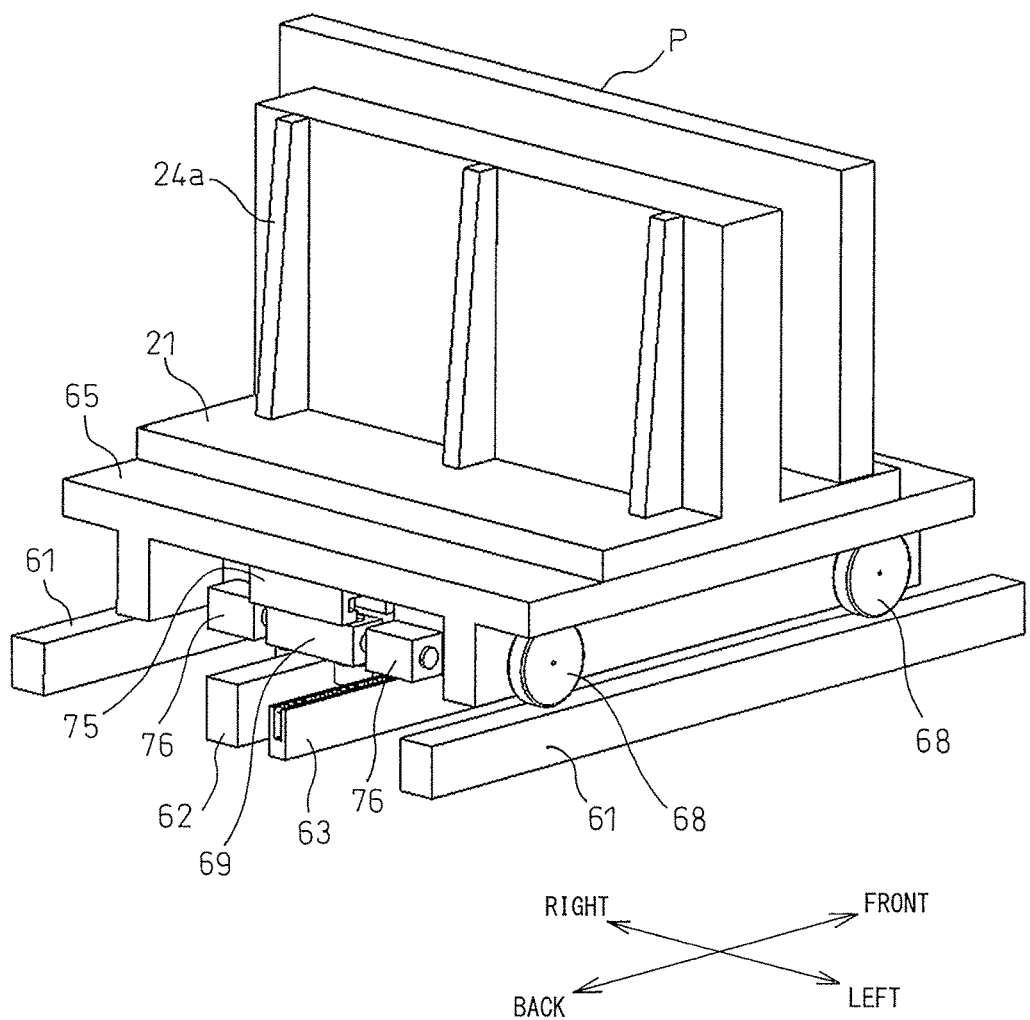
FIG. 17 is a perspective view of a pallet changing system at which a pallet transport system according to a third embodiment of the present invention is provided.
Figure 18:
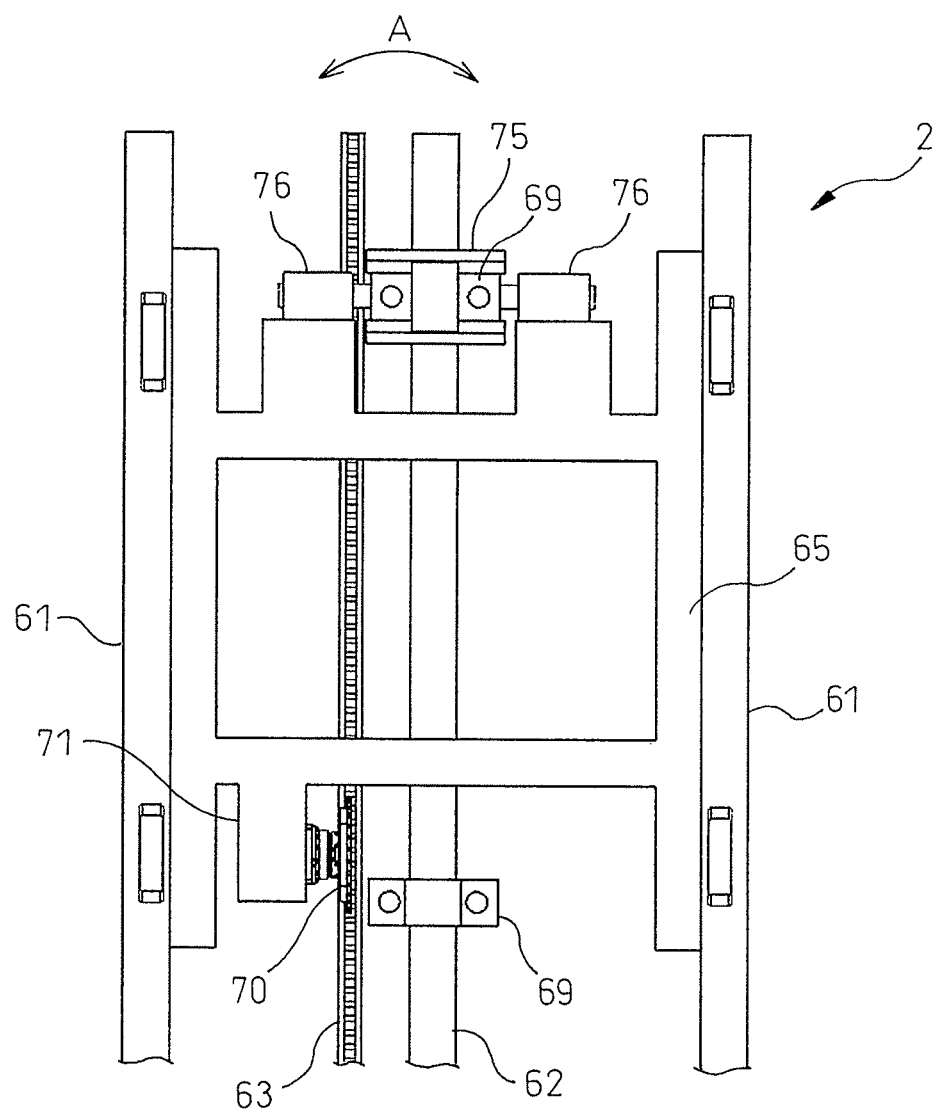
FIG. 18 is a plan view which mainly shows the configuration of a carriage of FIG. 17.

FIG. 17 is a perspective view of a pallet changing system 2 which has a pallet transport system according to the third embodiment, FIG. 18 is a plan view which mainly shows the configuration of the carriage of FIG. 17, and FIG. 19 is an enlarged view of principal parts of FIG. 18. Parts the same as in FIG. 1 to FIG. 13 are assigned the same reference notations. Below, the points of difference from the first embodiment will mainly be explained.

As shown in FIGS. 17 and 18, below the carriage 65, a pair of front and back guide blocks 69 which move along the center rail 62 are provided. Among these, the front side guide block 69 is fastened to the bottom surface of the carriage 65. On the other hand, as shown in FIG. 19, a guide rail 75 is fastened to the bottom surface of the back end portion of the carriage 65, and the back side guide block 69 is slidably engaged with a guide groove 75a of the guide rail 75 in the left-right direction. Furthermore, at the bottom part of the carriage 65, a pair of fastening cylinders 76 are fastened to the left and right sides of this guide block 69. Pistons 77 stick out from the left and right inside surfaces of the fastening cylinders 76.

The extension and retraction operations of the pistons 77 are controlled by the machine control system 4. Due to this control, other than at the time of transport of a pallet P from the pallet changing system 2 to the table 17, the pistons 77 are extended to the inside in the left-right direction. Due to this, the end faces of the pistons 77 abut against the left and right outside surfaces of the guide block 69, so the guide rail 75 is unable to slide with respect to the guide block 69. As a result, turning of the carriage 65 with respect to the rails 61 is prohibited and shaking of the pallet P can be suppressed.

At the time of transport of a pallet P, the pistons 77 are retracted toward the outside in the left-right direction. Due to this, the constraint of the guide rail 75 with respect to the guide block 69 is removed and the guide rail 75 can move in the left-right direction. At this time, when the engagement surface S1 of the pallet support stand 21 and the engagement surface S2 of the table 17 are not on the same plane, due to the contact force between the guide rollers 53 of the table 17 and the groove parts 54 of the pallet P, a pushing force acts on the pallet P to the front or the back. Due to this, as shown in FIG. 18, the carriage 65 turns in the arrow "A" direction about the front support rollers 69. As a result, the orientation of the engaged surface S0 is changed and the pallet P can be smoothly transported to the table 17.

Figure 20:
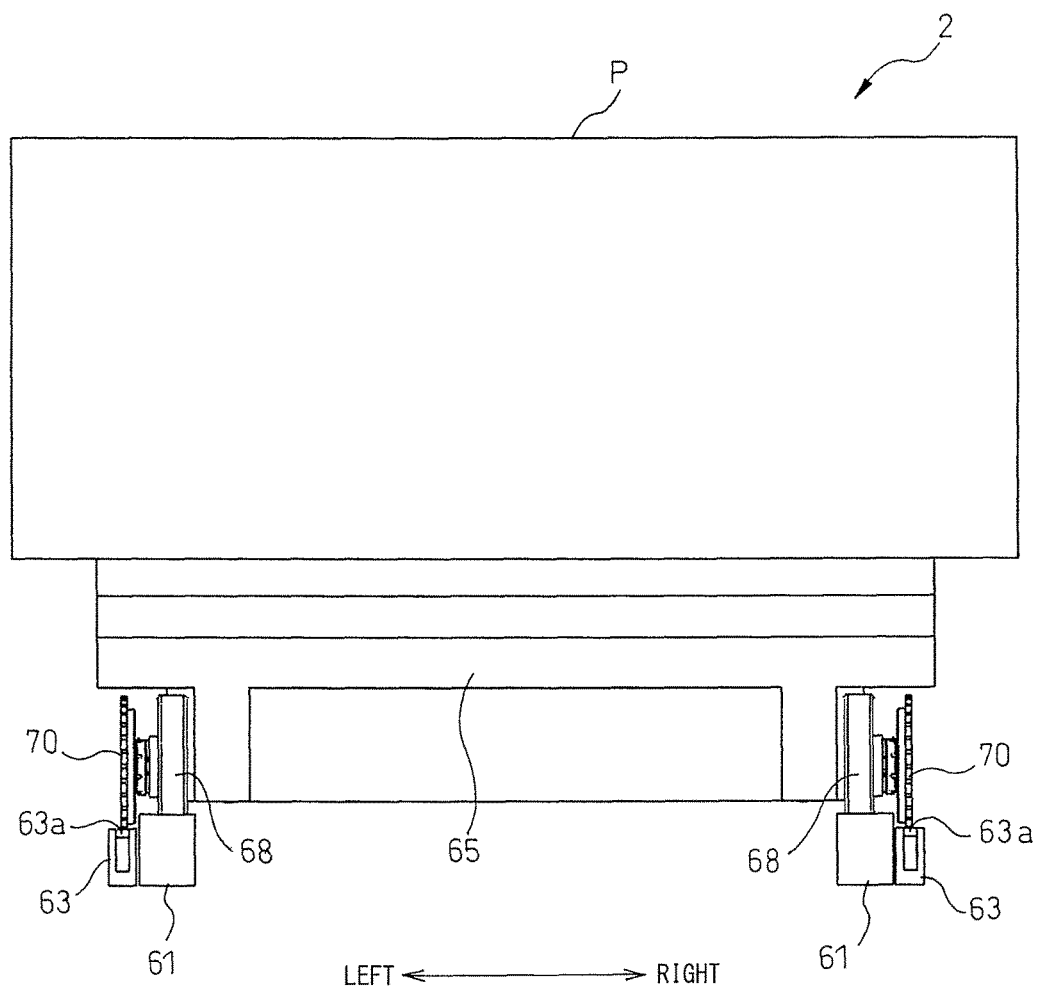
FIG. 20 is a front view of a pallet changing system which shows a modification of FIG. 17.
Figure 21:
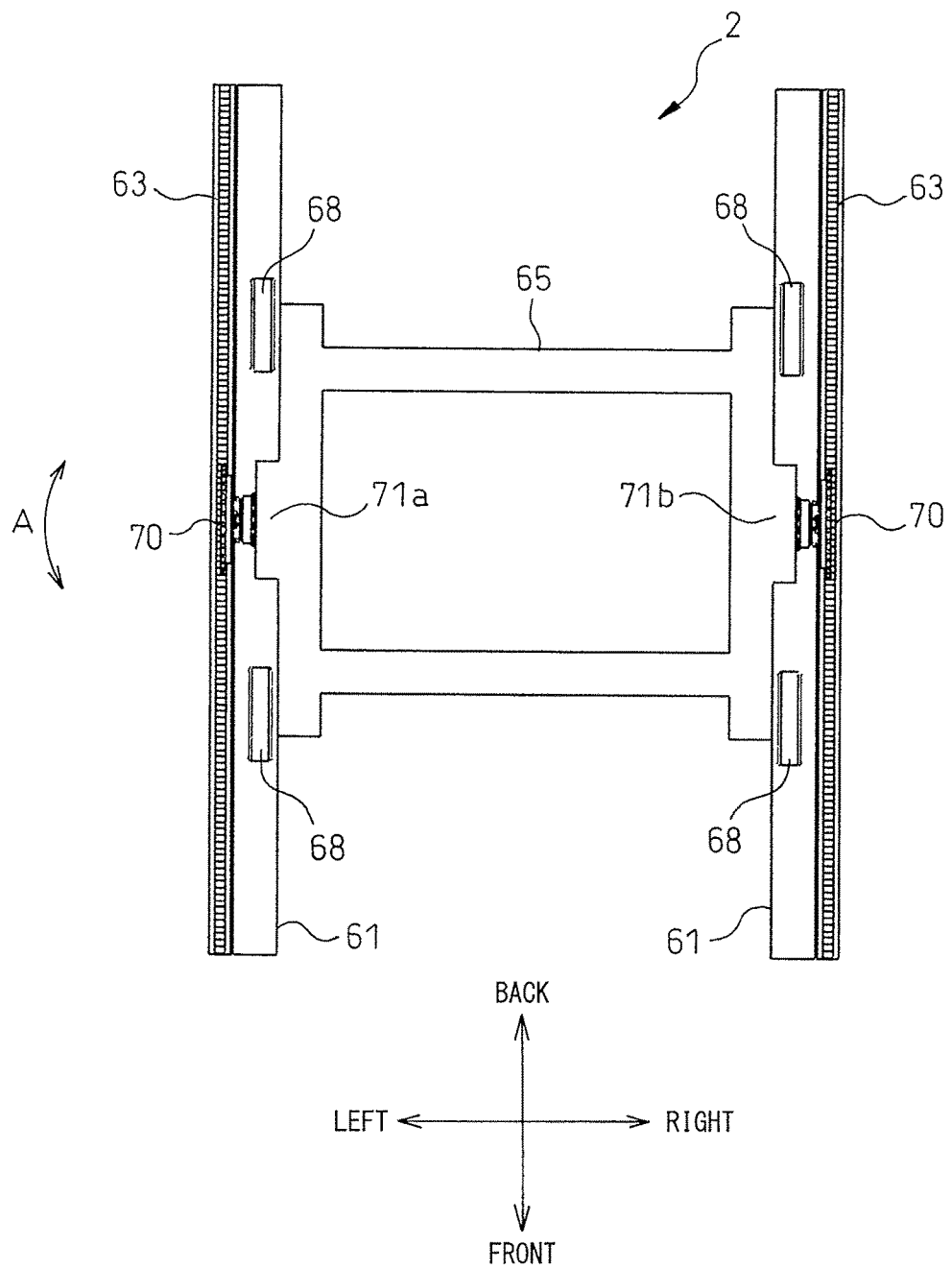
FIG. 21 is a plan view which mainly shows the configuration of a carriage of FIG. 20.

The configuration for enabling the carriage 65 to turn is not limited to the one explained above. FIG. 20 is a front view which shows another configuration for enabling the carriage 65 to turn (view seen from front), while FIG. 21 is a plan view which mainly shows the configuration of the carriage of FIG. 20. In this example, gear rails 63 are laid at the outsides in the left-right direction of the left and right rails 61. At the carriage 65, drive motors 71a and 71b are attached corresponding to the gear rails 63 at the left and right end portions. The drive gears 70 engage with the gear parts 63a of the gear rails 63, whereby the drive gears 70 are driven to rotate by the drive motors 71a and 71b.

When moving the carriage 65 to the setup position, the drive motors 71a and 71b are synchronously control by the machine control system. In this case, since movement of the carriage 65 is constrained by the drive motors 71a and 71b, the pallet P can be conveyed without shaking. On the other hand, when transporting a pallet P from the pallet support stand 21 to the table 17, the drive motors 71a and 71b are controlled so that the right side drive motor 71b is kept from rotating and the left side drive motor 71a is able to freely rotate. Due to this, the carriage 65 can turn in the arrow "A" direction about the engagement part of the drive gear 70 of the drive motor 71b and the gear part 63a of the gear rail 63, and the orientation of the pallet P can be changed.

Figure 22:
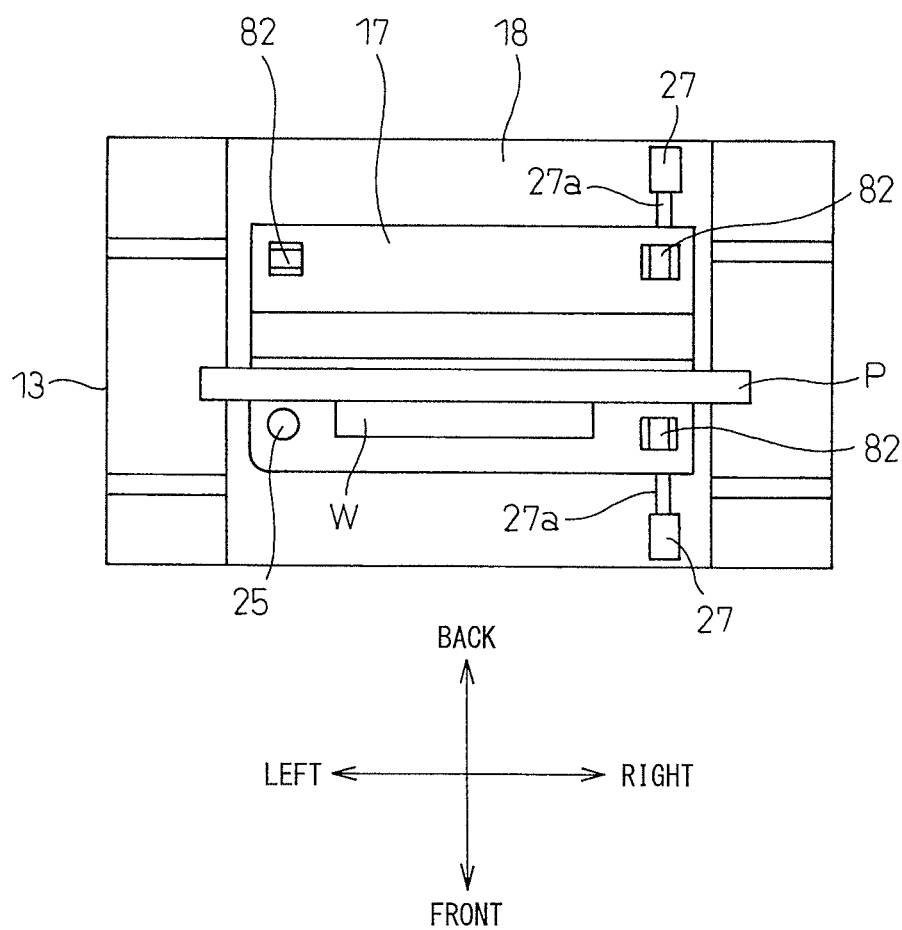
FIG. 22 is a plan view which shows an example of application of the pallet transport system according to the present embodiment to a machine tool.

In the above embodiments, although the pallet changing systems 2 and 3 are provided with turning mechanisms, the machine tool 1 may also be provided with a turning mechanism. FIG. 22 is a plan view which shows one example of this. In this example, the table support stand 18 is supported on the top surface of the second bed 13 movably in the left-right direction through an X-axis feed mechanism. The table 17 is turnably supported on the top surface of the table support stand 18 in the same way as the pallet support stand 21 of FIG. 12. That is, the shaft part 25 is attached to the left front end portion of the table 17, while tires 82 are attached to the left back end portion, the right front end portion, and the right back end portion. Furthermore, at the right end portion of the top surface of the table support stand 18, fastening cylinders 27 are attached so as to straddle the table 17 in the front-back direction.

The fastening cylinders 27 are driven while controlled by the machine control system 4. When machining a workpiece, pistons 27a of the fastening cylinders 27 are extended. Due to this, the table 17 is held on the table support stand 18, and the workpiece W can be stably machined. On the other hand, when transporting a pallet P, the pistons 27a of the fastening cylinders 27 are retracted. Due to this, the table 17 can turn about the shaft part 25, and transport of a pallet P from the pallet changing system 2 to the machine tool 1 and from the machine tool 1 to the pallet changing system 3 becomes easy.

Figure 23:
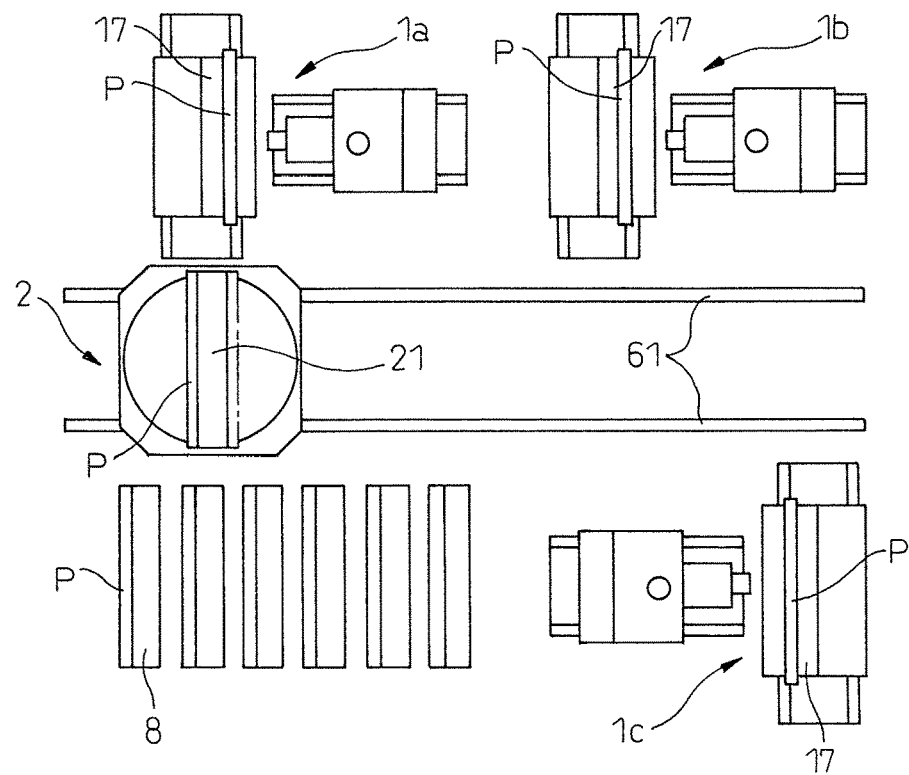
FIG. 23 is a view which shows a modification of FIG. 1.

In the above embodiments, the case when designating the pallet support stand 21 of the pallet changing system 2 as the "first stand" and the table 17 of the machine tool 1 as the "second stand" and transporting a pallet P from the first stand to the second stand, and the case when designating the table 17 of the machine tool 1 as the "first stand" and the pallet support stand 31 of the pallet changing system 3 as the "second stand" and conveying a pallet P from the first stand to the second stand are explained. However, members other than the pallet support stands 21 and 31 and the table 17 (for example, the pallet stocker) may also be used as the first stand and the second stand. FIG. 23 is a plan view of a machine tool facility as a whole which shows one example of this.

In FIG. 23, a plurality of pallet stockers 8 are arranged toward the same direction on the movement route of the pallet changing system 2. Pallets P are held at the pallet stockers 8. The pallet changing system 2 and the pallet stockers 8 have to be bridged by the pallets P. In this case, by providing the turning mechanism explained above at the pallet changing system 2, it is possible to facilitate transfer of a pallet P between the pallet changing system and the pallet stockers. As shown in FIG. 22, when providing a turning mechanism not at the pallet changing system 2, but the machine tool 1, it is sufficient to provide the turning mechanism at the pallet stockers 8. In FIG. 23, since a plurality of machine tools 1a to 1c are set along the rails 61, it is possible to successively convey pallets P to different machine tools 1a to 1c.

Figure 24:
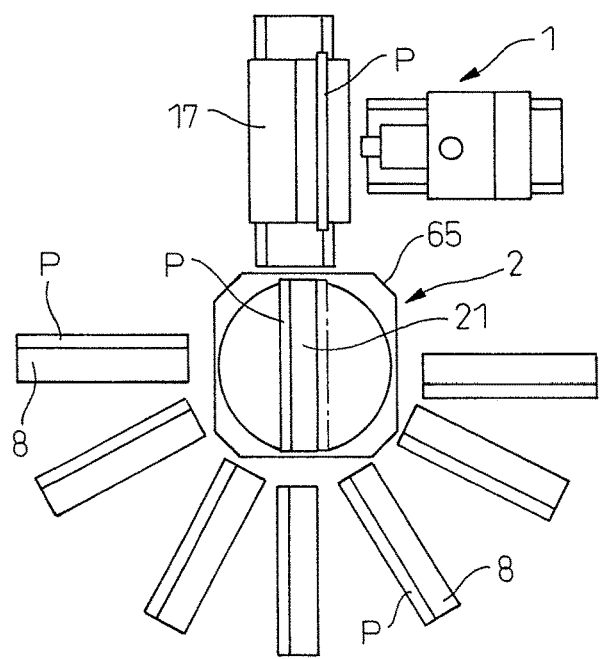
FIG. 24 is a view which shows another modification of FIG. 1.

When the machine tool 1 and the pallet stockers 8 are provided with turning mechanisms, the pallet support stand 21 at the pallet changing system 2 can be provided on the carriage 65 turnably by driving a motor, etc. In this case, for example, as shown in FIG. 24, it is possible to arrange a plurality of the pallet stockers 8 in a radial manner around a pallet changing system 2. It is also possible to provide a turning mechanism at the pallet changing system 2 and configure turnably the pallet support stand 21. In this case, it is sufficient to stop the turning operation of the pallet support stand 21 and to turnably support the pallet support stand 21 by the turning mechanism to transport a pallet P.

In the above embodiments, although a rack 55 is formed on the top surface of a pallet P, it is also possible to form the rack 55 at the center portion in the height direction of the pallet P and attach the drive motors M0, M1, and M2 at the center portions of the table 17 and the pallet support stands 21 and 31. Although drive motors M0, M1, and M2, rack 55 and pinion 52 are used to transport a pallet P, other moving means may also be used.

Although the guide rollers 22 of the pallet support stand 21 are used to define the first engagement surface S1, the guide rollers 53 of the table 17 are used to define the second engagement surface S2, and the groove parts 54 of the pallet P are used to define the engaged surface S0, it is also possible to attach a pallet P to the pallet support stand 21 and the table 17 by a manner other than engagement and thus configurations of the first mounting part, second mounting part, and mounted part are not limited to the one explained above. Therefore, other than the first engagement surface S1, second engagement surface S2, and the mounted surface S0, it is also possible to form a first mounting surface, second mounting surface, and mounted surface. For example, it is also possible to form the first mounting surface and the second mounting surface at the front surfaces of the pallet support stand 21 and the table 17, and form the mounted surface at the back surface of the pallet P.

In the above first embodiment, the tires 82 are attached to the pallet support stand 21 and the pallet support stand 21 is turnably supported on the carriage 65 about the shaft part 25. However, the configuration of the stand support parts is not limited to this so long as the pallet support stands 21 and 31 or the table 17 are turnably supported so that the orientation of the first engagement surface S1 or second engagement surface S2 changes due to the contact force between the pallet P and the table 17.

In the above second embodiment, the support roller 36 which has the slider 41 slidable with respect to the arm 38 in the front-back direction is used to support the pallet P from the pallet support stand 21 turnably about the support roller 35. However, the configuration of the pallet support parts is not limited to this so long as the pallet P is turnably supported at the pallet support stands 21 and 31 or the table 17 so that the orientation of the engaged surface S0 of a pallet P with respect to the pallet support stands 21 and 31 or the table 17 changes due to the contact force between the pallet P and the table 17.

In the above third embodiment, the bottom surface of the carriage 65 is provided with the guide rail 75 slidable with respect to the guide blocks 69 in the left-right direction to turnably support the carriage 65 on the rails 61. However, the configuration of the moving member support parts is not limited to this so long as the carriage 65 is turnably supported on the rails 61 so that the orientation of the first engagement surface S1 or second engagement surface S2 changes due to the contact force between the pallet P and the table 17.

The support mechanism may be configured by parts other than the stand support parts, pallet support parts, and moving member support parts described above so long as at least one of the pallet support stands 21 and 31, the table 17, and the pallet P is turnably supported so that the orientations of the engaged surface S0 and second engagement surface S2 or the engaged surface S0 and third engagement surface match due to the contact force between the groove parts 54 and guide rollers 53 or the groove parts 54 and guide rollers 32, along with transport of a pallet P from the pallet support stand 21 to the table 17 along the first engagement surface S1 or transport of a pallet P from the table 17 to the pallet support stand 31 along the second engagement surface S2.

In the above embodiments, although the movement route of a pallet P is generated by the rails 61 from the setup position to a pallet stocker, the movement route may also be generated from the setup position to another separated position. The route generation unit may also be configured by a part other than the rails 61. Therefore, the configuration of the moving member which moves together with the workpiece support stands 21 and 31 along the movement route is not limited to the carriage 65. In the above embodiments, although the fastening cylinders 27, 43a, 43, 76 or control of rotation of the drive motor 70 is used to prevent turning of the workpiece support stands 21 and 31 or the table 17 or the pallet P, the configuration of the turn prevention part is not limited to this.

According to the above invention, since at least one of the first stand, second stand, and pallet are supported to be able to turn so that the orientations of the mounted surface of the pallet and the pallet mounting surface of the second stand match due to the contact force which acts between the pallet and the second stand along with transport of the pallet from the first stand to the second stand, even if there is a slant between the pallet mounting surfaces of the first stand and the second stand, that slant can be automatically corrected and the pallet smoothly transported.

The invention claimed is:

1. A pallet transport system of a machine tool transporting a pallet for mounting a workpiece between a table of the machine tool and an adjoining setup position, wherein the table having a first mounting part for the pallet defining a first mounting surface extending along a transport direction of the pallet, which is a left-right direction, the pallet transport system comprising:
   a first drive mounted on the table for linearly driving the pallet in the transport direction of the pallet;
   a pallet support stand positioned at the setup position and having a second mounting part for the pallet defining a second mounting surface lying in a substantially same plane with the first mounting surface;
   a second drive mounted on the pallet support stand for linearly driving the pallet in the transport direction of the pallet;
   a support mechanism having a vertical shaft on which the pallet support stand is turnably supported so as to rotate around the vertical shaft, and having a lock device preventing a turning of the pallet support stand prior to a transport of the pallet and allowing for free turning of the pallet support stand during the transport of the pallet; and
   a carriage carrying the support mechanism and configured to move in a front-back direction, which is substantially orthogonal to the transport direction,
   wherein the pallet has a mounted part provided along the transport direction of the pallet and attachable to the first mounting part and the second mounting part,
   wherein the pallet transport system does not have a power drive rotatably driving the pallet support stand around the vertical shaft,
   wherein the lock device locks the pallet support stand while the carriage and the lock device are traveling toward the setup position and stops locking the pallet support stand so as to allow rotation of the pallet support stand around the vertical shaft when the carriage and the lock device reach the setup position,
   wherein when the carriage reaches the setup position the first or second drive linearly drives the pallet, and
   wherein when a misalignment occurs between an orientation of the first mounting surface and an orientation of the second mounting surface, the pallet support stand is turned around the vertical shaft due to a contact force generated between the mounted part and the first or second mounting part while the pallet is being moved along the transport direction, so that the orientation of the second mounting surface and the orientation of the first mounting surface are self-aligned in the transport direction of the pallet.

* * * * *